(12) United States Patent
Georges et al.

(10) Patent No.: US 9,065,931 B2
(45) Date of Patent: Jun. 23, 2015

(54) SYSTEMS AND METHODS FOR PORTABLE AUDIO SYNTHESIS

(75) Inventors: Alain Georges, Saint Paul de Vence (FR); Voislav Damevski, Huntingdon Valley, PA (US); Eric Laurent, Mandelien (FR); Stephane Viaud-Murat, Biot (FR); Daniel Chiaramello, Nice (FR); Peter Michael Blair, San Francisco, CA (US)

(73) Assignee: MEDIALAB SOLUTIONS CORP., Marshall, TX (US)

( * ) Notice: Subject to any disclaimer, the term of this patent is extended or adjusted under 35 U.S.C. 154(b) by 1575 days.

(21) Appl. No.: 10/555,360

(22) PCT Filed: Oct. 12, 2004

(86) PCT No.: PCT/US2004/033975
§ 371 (c)(1),
(2), (4) Date: Jul. 25, 2008

(87) PCT Pub. No.: WO2006/043929
PCT Pub. Date: Apr. 27, 2006

(65) Prior Publication Data
US 2009/0272251 A1   Nov. 5, 2009

Related U.S. Application Data

(63) Continuation-in-part of application No. 10/337,753, filed on Jan. 7, 2003, now Pat. No. 7,169,996, which is a continuation-in-part of application No. 10/293,737, filed on Nov. 12, 2002, now Pat. No. 7,102,069.

(51) Int. Cl.
G09B 15/00 (2006.01)
G09B 15/02 (2006.01)
(Continued)

(52) U.S. Cl.
CPC .............. *H04M 19/04* (2013.01); *G10H 1/00* (2013.01); *G10H 2210/111* (2013.01); *G10H 2230/021* (2013.01); *G10H 2240/031* (2013.01)

(58) Field of Classification Search
None
See application file for complete search history.

(56) References Cited

U.S. PATENT DOCUMENTS

| 4,399,731 A | 8/1983 | Aoki .............................. 84/1.03 |
| 4,577,067 A | 3/1986 | Levy et al. ............... 379/101.01 |

(Continued)

FOREIGN PATENT DOCUMENTS

| EP | 484047 | 10/1991 |
| EP | 0702366 | 9/1995 |

(Continued)

OTHER PUBLICATIONS

Beatnik Rich Music Format, 2 pages, 2002.
(Continued)

*Primary Examiner* — Marlon Fletcher
(74) *Attorney, Agent, or Firm* — Loudermilk & Associates

(57) ABSTRACT

A method for remixing a music piece includes providing a music composition graphical user interface on a portable communications device. The music composition graphical user interface displays a plurality of actionable menu items. A first collection of actionable menu items is provided to the graphical user interface from an internal source. A music remixing algorithm incorporates music rules and can remix the music piece in a manner where only one musical component is remixed at a given time. A music remix database is accessible via the graphical user interface. A plurality of music remix data is organized based in part on a music style parameter. A second collection of actionable menu items is provided from the music remix database to the graphical user interface via a communications network. The first and second collection of actionable menu items displayed in a seamless manner.

10 Claims, 34 Drawing Sheets

(51) Int. Cl.
*G10H 1/00* (2006.01)
*H04M 19/04* (2006.01)

(56) References Cited

U.S. PATENT DOCUMENTS

| | | | | |
|---|---|---|---|---|
| 4,787,073 | A | 11/1988 | Masaki | 369/32 |
| 5,054,360 | A | 10/1991 | Lisle et al. | 84/645 |
| 5,099,740 | A | 3/1992 | Minamitaka | 84/649 |
| 5,177,618 | A | 1/1993 | Dunlap et al. | 358/335 |
| 5,267,318 | A | 11/1993 | Severson | 381/51 |
| 5,281,754 | A | 1/1994 | Farrett et al. | 84/609 |
| 5,300,723 | A | 4/1994 | Ito | 84/601 |
| 5,307,456 | A | 4/1994 | MacKay | 395/154 |
| 5,308,915 | A | 5/1994 | Ohya | 395/22 |
| 5,350,880 | A | 9/1994 | Sato | 84/609 |
| 5,369,217 | A | 11/1994 | Yamashita et al. | 84/611 |
| 5,386,081 | A | 1/1995 | Nakada et al. | 84/609 |
| 5,425,297 | A | 6/1995 | Young, Jr. | 84/483.2 |
| 5,451,709 | A | 9/1995 | Minamitaka | 84/609 |
| 5,496,962 | A | 3/1996 | Meier et al. | 84/601 |
| 5,523,525 | A | 6/1996 | Murakami et al. | 84/602 |
| 5,581,530 | A | 12/1996 | Iizuka et al. | 369/93 |
| 5,590,282 | A | 12/1996 | Clynes | 395/200.02 |
| 5,627,335 | A | 5/1997 | Rigopulos et al. | 84/635 |
| 5,633,985 | A | 5/1997 | Severson | 395/2.76 |
| 5,640,590 | A | 6/1997 | Luther | 395/806 |
| 5,648,628 | A | 7/1997 | Ng et al. | 84/610 |
| 5,655,144 | A | 8/1997 | Milne et al. | 395/807 |
| 5,675,557 | A | 10/1997 | Hubinger | 369/4 |
| 5,689,081 | A | 11/1997 | Tsurumi | 84/609 |
| 5,753,843 | A | 5/1998 | Fay | 84/609 |
| 5,763,804 | A | 6/1998 | Rigopulos et al. | 84/635 |
| 5,787,399 | A | 7/1998 | Lee | 704/270 |
| 5,792,971 | A | 8/1998 | Timis et al. | 84/609 |
| 5,801,694 | A | 9/1998 | Gershen | 345/339 |
| 5,824,933 | A | 10/1998 | Gabriel | 84/609 |
| 5,825,355 | A * | 10/1998 | Palmer et al. | 715/712 |
| 5,832,431 | A | 11/1998 | Severson | 704/258 |
| 5,839,108 | A | 11/1998 | Daberko et al. | 704/270 |
| 5,864,868 | A | 1/1999 | Contois | 707/104 |
| 5,877,445 | A | 3/1999 | Hufford et al. | 84/602 |
| 5,886,274 | A | 3/1999 | Jungleib | 84/601 |
| 5,900,566 | A | 5/1999 | Mino | 84/610 |
| 5,913,258 | A | 6/1999 | Tamura | 84/604 |
| 5,914,941 | A | 6/1999 | Janky | 370/313 |
| 5,928,330 | A | 7/1999 | Goetz et al. | 709/231 |
| 5,969,716 | A | 10/1999 | Davis et al. | 345/328 |
| 5,981,860 | A | 11/1999 | Isozaki | 84/603 |
| 6,008,446 | A | 12/1999 | Van Buskirk et al. | 84/603 |
| 6,011,212 | A | 1/2000 | Rigopulos et al. | 84/667 |
| 6,051,770 | A | 4/2000 | Milburn et al. | 84/611 |
| 6,072,480 | A | 6/2000 | Gorbet et al. | 345/302 |
| 6,074,215 | A | 6/2000 | Tsurumi | 434/307 |
| 6,083,009 | A | 7/2000 | Kim et al. | 434/307 |
| 6,084,168 | A | 7/2000 | Sitrick | 84/477 |
| 6,093,880 | A | 7/2000 | Arnalds | 84/464 |
| 6,121,533 | A | 9/2000 | Kay | 84/616 |
| 6,143,971 | A | 11/2000 | Aoki et al. | 84/609 |
| 6,143,973 | A | 11/2000 | Kikuchi | 84/645 |
| 6,153,821 | A | 11/2000 | Fay et al. | 84/634 |
| 6,182,126 | B1 | 1/2001 | Nathan et al. | 709/219 |
| 6,192,340 | B1 | 2/2001 | Abecassis | 704/270 |
| 6,225,547 | B1 | 5/2001 | Toyama et al. | 84/611 |
| 6,230,140 | B1 | 5/2001 | Severson | 704/274 |
| 6,245,984 | B1 | 6/2001 | Aoki et al. | 84/611 |
| 6,281,424 | B1 | 8/2001 | Koike et al. | 84/636 |
| 6,326,538 | B1 | 12/2001 | Kay | 84/635 |
| 6,343,055 | B1 | 1/2002 | Ema et al. | 369/531.6 |
| 6,353,169 | B1 | 3/2002 | Juszkiewicz et al. | 84/600 |
| 6,353,172 | B1 | 3/2002 | Fay et al. | 84/609 |
| 6,353,174 | B1 | 3/2002 | Schmidt et al. | 84/609 |
| 6,425,018 | B1 | 7/2002 | Kaganas et al. | 710/1 |
| 6,429,863 | B1 | 8/2002 | LoPiccolo et al. | 345/419 |
| 6,472,591 | B2 | 10/2002 | Aoki et al. | 84/611 |
| 6,506,969 | B1 | 1/2003 | Baron | 84/609 |
| 6,541,691 | B2 | 4/2003 | Tolonen et al. | 84/616 |
| 6,576,828 | B2 | 6/2003 | Aoki et al. | 84/635 |
| 6,576,878 | B2 | 6/2003 | Thorpe et al. | 219/645 |
| 6,639,141 | B2 | 10/2003 | Kay | 84/609 |
| 6,657,116 | B1 | 12/2003 | Gunnerson | 84/615 |
| 6,683,241 | B2 | 1/2004 | Wieder | 84/609 |
| 6,696,631 | B2 | 2/2004 | Smith et al. | 84/645 |
| 6,815,600 | B2 | 11/2004 | Georges et al. | 84/609 |
| 6,835,884 | B2 | 12/2004 | Iwamoto et al. | 84/609 |
| 6,897,368 | B2 | 5/2005 | Georges et al. | 84/609 |
| 6,916,978 | B2 | 7/2005 | Georges et al. | 84/609 |
| 6,970,822 | B2 | 11/2005 | Fay et al. | 704/270 |
| 7,078,607 | B2 * | 7/2006 | Alferness | 84/609 |
| 7,078,609 | B2 | 7/2006 | Georges | 84/645 |
| 7,183,482 | B2 | 2/2007 | Kobayashi | 84/645 |
| 7,189,915 | B2 | 3/2007 | Kobayashi | 84/645 |
| 7,241,947 | B2 | 7/2007 | Kobayashi | 84/645 |
| 7,319,185 | B1 | 1/2008 | Wieder | 84/609 |
| RE40,645 | E * | 3/2009 | Marshall et al. | 1/1 |
| 7,678,983 | B2 * | 3/2010 | Komori et al. | 84/600 |
| 7,956,272 | B2 * | 6/2011 | Wysocki et al. | 84/477 R |
| 8,188,357 | B2 * | 5/2012 | Robbin et al. | 84/618 |
| 2003/0212466 | A1 * | 11/2003 | Alferness | 700/94 |
| 2004/0106395 | A1 * | 6/2004 | Suganuma et al. | 455/412.2 |
| 2005/0120866 | A1 * | 6/2005 | Brinkman et al. | 84/609 |
| 2006/0107822 | A1 * | 5/2006 | Bowen | 84/612 |
| 2006/0129842 | A1 * | 6/2006 | Herberger et al. | 713/189 |
| 2006/0130636 | A1 * | 6/2006 | Toledano et al. | 84/600 |
| 2006/0233055 | A1 * | 10/2006 | Hendrickson et al. | 369/1 |
| 2006/0235864 | A1 * | 10/2006 | Hotelling et al. | 707/101 |
| 2007/0038931 | A1 * | 2/2007 | Allaire et al. | 715/526 |
| 2007/0083380 | A1 * | 4/2007 | Martinez | 705/1 |
| 2007/0083471 | A1 * | 4/2007 | Robbin et al. | 705/51 |
| 2007/0083762 | A1 * | 4/2007 | Martinez | 713/176 |
| 2008/0269931 | A1 * | 10/2008 | Martinez | 700/94 |
| 2009/0139389 | A1 * | 6/2009 | Bowen | 84/636 |
| 2010/0186578 | A1 * | 7/2010 | Bowen | 84/612 |
| 2011/0179943 | A1 * | 7/2011 | Bowen | 84/612 |
| 2012/0210844 | A1 * | 8/2012 | Willacy et al. | 84/609 |

FOREIGN PATENT DOCUMENTS

| | | |
|---|---|---|
| EP | 0747877 | 6/1996 |
| EP | 0857343 | 10/1996 |
| GB | 2306043 | 4/1997 |
| JP | 06295567 | 10/1994 |
| WO | WO 88/05200 | 7/1988 |
| WO | WO 89/02641 | 3/1989 |
| WO | WO 97/15043 | 4/1997 |
| WO | WO 97/35299 | 9/1997 |
| WO | WO 98/33169 | 7/1998 |
| WO | WO 01/63592 | 8/2001 |
| WO | WO 01/73748 | 10/2001 |
| WO | WO 0186625 | 11/2001 |
| WO | WO 0186626 | 11/2001 |
| WO | WO 0186627 | 11/2001 |
| WO | WO 0186628 | 11/2001 |
| WO | WO 0186629 | 11/2001 |
| WO | WO 0186630 | 11/2001 |
| WO | WO 02077585 | 10/2002 |

OTHER PUBLICATIONS

Beatnik Audio Engine White Paper, 6 pages, 2001.
Beatnik AudioEngine, 2 pages, 2002.
Beatnik mobileBAE version 02.02w, 2 pages, 2002.
Beatnik mobileBAE version 11.02w, 2 pages, 2002.
Combining musical theory and practice, IBM Computer Music Center, apparently Jun. 29, 1995.
*dream*. An Atmel Company: SAM9407. "Programmer's Reference." pp. 1-61. Rev. 11. Dec. 1996.
*dream*, an Atmel Company: SAM9707, "Integrated Sound Studio," pp. 1-20, Jan. 1998.
GenJam: An Interactive Genetic Algorithm Jazz Improviser, John A. Biles, popular version of paper 4pMU1 apparently presented Dec. 4, 1997.
GenJam: A Genetic Algorithm for Generating Jazz Solos, John A. Biles, date apparently after 1993.

(56) References Cited

OTHER PUBLICATIONS

GenJam Populi: Training an IGA via Audience-Mediated Performance, John A. Biles, apparently Sep. 15, 1995.

Information on how to purchase Kid Riffs, IBM, date unknown.

Interactive GenJam: Integrating Real-Time Performance with a Genetic Algorithm, John A. Biles, apparently after 1996.

Hemmings, Richard, Scary Computer Music, apparently from Avant Magazine, Issue 7, Summer 1998, p. 12.

Louis, Duke, Miles—and MAC? Business Week Archives, apparently Dec. 18, 1995.

Mithic, a New Generation of Music, Thomson Multimedia, 3 pages, Jul. 8, 2002.

Mithic, the First Interactive Music Composer, 2 pages, 2002.

Thomson Multimedia launches Mithic, a unique Technology to to deliver personalized interactive Music, Feb. 25, 2002.

Thomson to present the Mithic Composer Technology at DEMOmobile Conference, Sep. 19, 2002.

Mobile Media Analyst, "Music Services Might Soon Break Out of the Ring-Tone Mold," Mobile Media management report, pp. 5-12, Jan. 10, 2003.

Motorola C350 Cellular Phone User Manual, selected pages on MotoMixer Sound Editor, Motorola, Inc., pp. 1, 2, 129-131, 2002.

Music Sketcher Section Details, IBM, apparently 1998.

Musical Computers, Miles Davis, version 2.1, apparently from the Economist, Dec. 6, 1997, p. 92.

Roland Corporation, "Personal Music Assistant Owner's Manual", Dec. 18, 1995, Entire Manual.

Tam Hays, "DirectMusic for the Masses", Garnasutra.corn article believed to be originally published in Game Developer Magazine Sep. 1998, 27 pages.

Microsoft, "Microsoft DirectMusic Producer: Game Development Tutorial", believed to be dated Nov. 12, 2002 (file date of electronic file) or earlier, 52pages.

USPTO Publication No. US 2001/0025561, Milburn et al., Published Oct. 2001, Class 84/609.

USPTO Publication No. US 2002/0023529, Kurakake et al., Published Feb. 28, 2002, Class 84/610.

USPTO Publication No. US 2002/0033090, Iwamoto et al., Published Mar. 21, 2002, Class 84/609.

USPTO Publication No. US 2002/0046315, Miller et al., Published Apr. 2002.

USPTO Publication No. US 2002/0046899, Mizuno et al., Published Apr. 25, 2002, Class 181/142.

USPTO Publication No. US 2002/0065074, Cohn et al., Published May 2002.

USPTO Publication No. US 2002/0170415. Nov. 21, 2002, "System and Method for Music Creation and Rearrangment", by Hruska et al., U.S. Appl. No. 10/106,743.

USPTO Publication No. US 2003/0013497, Yamaki et al., Published Jan. 16, 2003, Class 455/567.

USPTO Publication No. US 2003/0079598, Nakayama, Published May 2003.

USPTO Publication No. US 2003/0176206, Taniguchi et al., Published Sep. 18, 2003, Class 455/567.

USPTO Publication No. US 2003/0205125, Futamase et al.., Published Nov. 6, 2003, Class 84/622.

USPTO Publication No. US 2004/0039796, Watkins, Published Feb. 2004.

USPTO Publication No. US 2004/0064320, Chrysanthakopoulos et al., Published Apr. 1, 2004.

USPTO Publication No. US 2004/0088169, Smith et al., Published May 6, 2004.

USPTO Publication No. US 2004/0231499, Kobayashi, Published Nov. 2004.

USPTO Publication No. US 2006/0156909, Kobayashi, Published Jul. 2006.

USPTO Publication No. US 2006/0185504, Kobayashi, Published Aug. 2006.

\* cited by examiner

Example of xml style categories file:

```xml
<?xml version="1.0" ?>
<StyleCategories>
    <Request path="/madmodule/get.php" query="?style=">
    </Request>
    <Groups>
        <style id="1" name="HipHop" />
        <style id="2" name="Rap" />
        <style id="3" name="Techno" />
        <style id="4" name="House" />
        etc....
    </Groups>
</StyleCategories>
```

FIG. 6

Example of xml songs list file:

```
<?xml version="1.0" ?>
<Songs>
    <Request path="/module/get.php" query="?song=" />
    <Category id="1" name="By Songs" />
    <List>
        <song id="1" title="American Life" author="Madonna" filename="AmericanL.mad"
              size="5088" />
        <song id="2" title="Another Day" author="Madonna" filename="AnotherDay.mad"
              size="6088" />
        <song id="3" title="Without me" author="Eminem" filename="withoutme.mad"
              size="4868" />
        <song id="4" title="Sur un air Latino" author="Star Ac" filename="Latino.mad"
              size="788" />
    </List>
</Songs>
```

FIG. 7

Sub-Block Generation

MIDI/Audio Stream

|  | NRPN Stream (Hexadecimal) | Indication/Meaning |
|---|---|---|
| 1 | B0 | Channel Number |
| 2 | 63 | NRPN Controller A (e.g., audio sample type) |
| 3 | 40 | Identification of sample type (e.g., long, short, stereo, mono, etc.) |
| 4 | 00 | Delta time |
| 5 | 62 | NRPN Controller B (e.g., audio effects type) |
| 6 | 00 | Identification of effects type (ping pong, ripple, phaser, distortion, etc.) |
| 7 | 00 | Delta time |
| 8 | 06 | Identification of register for NRPN Controller A value |
| 9 | 03 | NRPN Controller A value (play 3$^{rd}$ audio sample in set, '00' is random) |
| 10 | 00 | Delta time |
| 11 | 26 | Identification of register for NRPN Controller B value |
| 12 | 07 | NRPN Controller B value (apply audio effect #7, '00' is random) |

Simplified NRPN Example

FIG. 28

Simplified Special MIDI Type File

Node/Subscriber Unit Radio Style Selection

Node/Subscriber Unit Functional Blocks

| | |
|---|---|
| Application Revision | Firmware/application version used to generate the data structure |
| Style, SubStyle | The style and/or substyle (and/or Radio Station Style) |
| Sound Bank, Synth Type | The sound bank/synth type |
| Sample Frequency | How often a sample is played in song |
| Sample List | List of samples associated with the Style |
| Key | First Key used, pitch offset |
| Tempo | Start Tempo (e.g., in pulses per quarter note) |
| Song Structure | Number of types, number of parts, sequence of parts, etc. |
| Structure | For every part: number of sub-parts, sequence of sub-parts, etc. Indexed by Part |
| Filtered Track | Type, function (e.g., sawtooth wave, sine wave, square wave, etc.), initial value, etc., of an effect. Indexed by Part. |
| Progression | Time signature, number of SEQs, list of masked types, etc. Indexed by Sub-Part. |
| Chord | Time stamp, chord vector, key note, progression mode, etc. Indexed by Sub-Part. |
| Pattern | Combination (Instrument), block data, effects data, etc. Indexed by Type. |
| Combination | List of instruments. Sub-set of 'Pattern' above. |
| FX Pattern | Effects data. Sub-set of 'Pattern' above. |
| Blocks | Block data. Subset of 'Pattern' above. |
| Instrument | Identification of a particular instrument in an instrument group. Indexed by type of instrument |
| State | State of instrument indexed by instrument type (e.g., muted, un-muted, normal, Forced play, solo, etc.) |
| Parameter | Instrument parameters indexed by instrument type (e.g., volume, param1, param2, etc.) |
| PRNG Seed Values | Preferably a series of numerical values that are used to initialize the pseudo-random number generation (PRNG) routines (used in certain embodiments). |
| Sound Bank Data | Soundbank data associated with a particular song; preferably loaded into non-volatile memory such that the sound bank data may be used during the generation of music output. |

Example Music Data File

FIG. 35

Example of Music Generation Flow

| Data Services | Description |
|---|---|
| TIA/EIA IS-95A | Mobile Station-Base Station Compatibility standard for Dual-Mode Wideband Spread Spectrum Cellular System |
| TIA/EIA IS-99 | Data Service Option standard for Wideband Spread Spectrum Digital Cellular System |
| TIA/EIA IS-637 | Short Message Service for Wideband Spread Spectrum Cellular System |
| TIA/EIA IS-657 | Packet Data Service Optional standard for Wideband Spread Spectrum Systems |
| TIA/EIA IS-658 | Data Services Interworking Function Interface for Wideband Spread Spectrum Systems |
| TIA/EIA IS-707 | Short Message Service 14.4 Kbps |
| TIA/EIA TSB-79 | Short Message Service for Wideband Spread Spectrum Systems |
| TIA/EIA TSB39-A | Message Type Assignments |

Exemplary Standards associated with
Cellular Data transmission/Reception Services

FIG. 37

SMS Broadcast Message Parameters

| Parameter | Type |
|---|---|
| Broadcast Service Category | Mandatory |
| Bearer Data | Optional |

The Bearer Data parameter variable-length format:

| Field | Length (bits) |
|---|---|
| PARAMETER_ID | 8 |
| PARAMETER_LEN | 8 |
| One or more occurrences of the following subparameter record: | |
| SUBPARAMETER_ID | 8 |
| SUBPARAM_LEN | 8 |
| Subparameter Data | 8 ∞ SUBPARAM_LEN |

PARAMETER_ID: SMS parameter identifier. This field shall be set to '00001000'.

PARAMETER_LEN: SMS message parameter length. This field shall be set to the number of octets in the parameter, not including the PARAMETER_ID and PARAMETER_LEN fields.

SUBPARAMETER_ID: Subparameter identifier.

SUBPARAM_LEN: Subparameter length. This field shall be set to the number of octets in the subparameter, not including the SUBPARAMETER_ID and SUBPARAM_LEN fields.

Subparameter Data: Subparameter data fields.

Exemplary Excerpts from
TIA/EIA IS-637 Short Message Service for Wideband
Spread Spectrum Cellular System

FIG. 38

Exemplary Synthesis Structure

SYSTEMS AND METHODS FOR PORTABLE AUDIO SYNTHESIS

A need has been recognized for systems and methods of music remixing and playback, particularly in the field of alert tones for portable communications devices such as cellular telephones, pagers, personal digital assistants, and handheld video game devices. Reference is made to the following patent applications, all by inventors hereof, which are hereby incorporated by reference, which disclose various systems and methods for remixing and/or playing music. This application is a continuation-in-part of U.S. PCT Application Serial No. PCT/US 03/40051, filed on Nov. 25, 2003, which is a continuation-in-part of U.S. application Ser. No. 10/337,753, filed on Jan. 7, 2003, which is a continuation-in-part of U.S. application Ser. No. 10/293,737, filed on Nov. 12, 2002. The foregoing patent documents and those upon which this application claims priority are sometimes referenced collectively herein as the "Referenced Patent Documents."

FIELD OF THE INVENTION

The present invention relates to systems and methods for audio creation and/or playback in a portable device such as a communications device. Furthermore, the present invention relates to systems and methods for creating, modifying, interacting with and playing music, and more particularly to systems and methods employing a top-down and interactive auto-composition process, where the systems/methods provide the user with a musical composition that may be modified and interacted with and played and/or stored (for later play) in order to create music that is desired by the particular user. Furthermore, the present invention relates to systems and methods for broadcasting music, and more particularly to systems and methods employing a data-file-based distribution system, where at least portions of the music can be generated by a node/subscriber unit upon reception of a data file, which is processed using a music generation system that preferably composes music based on the data file. Additionally, the present invention relates to such systems and methods wherein music data files can be authored or modified by a node/subscriber unit and shared with others, preferably over a cellular or other wireless network.

BACKGROUND OF THE INVENTION

As used herein, 'ringtone' refers to a sound that plays on a device to alert a user of something, such as an incoming call, a message, etc. In addition 'ringtone' can refer to other types of alert tones, such as a ringback tone, which typically is a sound that is played by a service provider to an incoming caller while a communications device is ringing (e.g., in the case of a phone, the ringing that occurs before the phone is answered). Ringtone remixing has become a recent focus of innovation. Existing approaches involve a remixer server, a cellular phone device issuing commands to the server, and a remixed music file sent from the server to the phone, for use as a ringtone. Typically, in the prior art, all remixing functions are performed by a server, and a music file (e.g., a simple MIDI file, or similar variant, with finalized pitch and rhythmic data) is output by the server to the cellular telephone. As an example, US Patent Application Publication US 2004/0106395 A1 assigned to Improvista Interactive Music, Inc., in Campbell, Calif., describes such an approach wherein a phone connects to a remixer server (e.g., directly over the cellular network, or indirectly via a computer on the internet) and a use is able to issue instructions via the telephone interface to the remixer server, the server performs a remixing process, and a music file is sent to the telephone via the cellular network for use as a ringtone. Additionally, a database is described that facilitates the billing process wherein the user pays for the ringtone remixing event.

However, certain limitations and problems are evident in the prior art approaches to ringtone music remixing. For example, advanced remixing functions are limited, such as the ability to remix an individual instrument within a musical piece, e.g., without affecting the other instruments or musical components. Also, the phone is the only method of providing an interface to the user, and thus the user interface is confined to the relatively limited display, keyboard, processing power, etc., of the phone itself, even in situations where the phone is accessing the remixer server via a Personal Computer. In addition, all remixing is performed on the server, and so certain benefits of distributed processing are not available. Very little capabilities are known in the way of video components to the ringtone music, as well as teachings in connection with high-quality audio, e.g., that may be suitable for music listening (e.g., stereo playback, etc.), and therefore containing more quality than is typically associated with ringtone music pieces.

Broadcast music distribution historically has involved the real-time streaming of music over the airwaves using an FM or AM broadcasting channel. Similarly, the Internet has been used for audio streaming of music data in an approximately real time manner. Both of these examples involve steadily sending relatively large amounts of data, and consume relatively large amounts of the available bandwidth. The number of music styles and the amount of bandwidth required to make effective use of these systems have limited the usefulness of these approaches to a broad range of new products incorporating wireless computing resources (e.g., cellular telephones and/or personal data assistants (PDAs)). In addition, the limitations of these approaches to music distribution make it inordinately difficult to enable a node/subscriber unit to share music, either as part of the radio-type distribution of music, or with other node/subscriber units directly, and in particular music that has been authored or modified by a user of the node/subscriber unit.

In the field of the present invention it is difficult to provide high quality audio synthesis in an environment with relatively limited processing resources. Typically high quality audio synthesis may involve a specialized DSP chip that consumes power, and adds significantly to the cost of the overall system. For example, in a cellular telephone that provides MIDI-based ringtones, typically a specialized MIDI DSP is incorporated that may add to the overall cost of development and materials of the system, as well as typically having an adverse impact on the battery life of the product. Furthermore, in many cases such a system may not provide high quality audio synthesis, notwithstanding the specialized DSP hardware.

In addition, prior art approaches to ringtone remixing involve relatively simple loop-based remixing, and do not enable a more sophisticated music creation/remix process that preferably may involve music rules as well as a much greater variety of music that sounds pleasing to the ear.

Accordingly, it is an object of the present invention to provide systems and methods for creating, modifying, interacting with and/or playing music employing a top-down process, where the systems/methods provide the user with a musical composition that may be modified and interacted with and played and/or stored (for later play) in order to create music that is desired by the particular user.

It is another object of the present invention to provide systems and methods for creating, modifying, interacting with and/or playing music in which music may be automatically composed in a variety of distinct musical styles, where a user may interact with auto-composed music to create new music of the particular musical style, where the system controls which parameters may be modified by the user, and the range in which such parameters may be changed by the user, consistent with the particular musical style.

It is another object of the present invention to provide systems and methods for using pre-existing music as input(s) to an algorithm to derive music rules that may then be used as part of a music style in a subsequent auto-composition process.

It is another object of the present invention to provide systems and methods for creating, modifying, interacting with and/or playing music based on efficient song structures and ways to represent songs, which may incorporate or utilize pseudo-random/random events in the creation of musical compositions based on such song structures and ways to represent songs.

It is another object of the present invention to provide systems and methods for creating, modifying, interacting with and/or playing music in which songs may be generated, exchanged and disseminated, preferably or potentially on a royalty free basis.

It is another object of the present invention to provide systems and methods for distributing, broadcasting, and/or sharing music employing a node-based music generation process, where the systems/methods enable the user to receive (via the node/subscriber unit) and/or author or modify a data file from which the music may be composed.

It is another object of the present invention to enable music data to be broadcast or transmitted over a cellular or other wireless network.

It is another object of the present invention to enable server-based, client-based, and hybrid ringtone remixing capabilities for a portable communications device such as a cellular telephone.

It is another object to provide music remixing capability for a music video piece, wherein a composition algorithm is employed to remix one or more components of the music video piece.

It is another object of the present invention to enable a music remixing capability involving a personal computer interface, e.g., wherein a ringtone is remixed/composed via a PC, and forwarded to a communications device for use as an alert tone.

It is another object of the present invention to enable a music remixing capability wherein an individual component of the music piece may be easily composed anew during a remix process, such as a drum track.

It is another object of the present invention to provide a music-rule based remixing function, that preferably goes beyond simple loop-based substitution processing, and provides a variety of output music results that sound pleasing to the ear.

It is another object of the present invention to provide a data collection/billing and or music group marketing capability for use as part of a music remixing service.

Finally, it is another object of the present invention to enable a dynamic ringtone capability, wherein a music piece may be remixed automatically at each use, e.g., as an incoming call alert tone remixed before each incoming call event.

SUMMARY OF THE INVENTION

The present invention is directed to the selection, composition, remix, download and playback of music files, and is expected to be particularly useful in the context of music files used in connection with a portable communications device (such as ringtone alert tones, including ringback tones). However, many aspects of the preferred embodiments are also suitable for a non-portable music playback device, e.g., such as a personal computer connected to a network (e.g., wired or wireless).

A server architecture is disclosed herein that preferably may be accessed by a client device (e.g., such as a personal computer or a portable communications device such as a cellular telephone) to provide data relating to a collection of available music files. Such a server architecture may include billing and payment capabilities, e.g., to facilitate the purchase of one or more music pieces. In addition to, or in some case in alternative to, the data provisioning function, such a server may be configured to provide music remixing functions. Such remix capabilities may include, for example, merely the ability to authorize a client to remix a music piece, or, alternatively, the ability to receive remix instructions from the client, and to execute remixing algorithms on the server before responding to the client with a remixed music piece. The term "remix" as used herein may include the function of creating music as well as re-creating variations to a musical piece. In addition, in certain preferred embodiments the server may be configured to respond to multiple classes of clients, e.g., wherein one client may request one capability from the server, and another client may request another capability.

A client architecture is described herein that preferably may access a server device (e.g., such as a web server on the internet) to receive data relating to a collection of available music files. Such a client architecture may include billing and payment capabilities, e.g., to facilitate the purchase of one or more music pieces. In addition to, or in some case in alternative to, the data provisioning function, such a client may be configured with certain music remixing functions. Such remix capabilities may include, as examples: the ability to authorize a server to remix a music piece; the ability to receive remix authorization instructions from the server, and to execute remixing algorithms on the client; or a remix algorithm that is executed entirely on a client. The term "remix" as used herein may include the function of creating music as well as re-creating variations to a musical piece.

Preferred embodiments employ a top-down process, where the system provides the user with in effect a complete musical composition, basically a song, that may be modified and interacted with and played and/or stored (for later play) in order to create music that is desired by the particular user. Utilizing an auto-composition process employing musical rules and preferably a pseudo random number generator, which may also incorporate randomness introduced by timing of user input or the like, the user may then quickly begin creating desirable music in accordance with one or a variety of musical styles, with the user modifying the auto-composed (or previously created) musical composition, either for a real time performance and/or for storing and subsequent playback.

In accordance with preferred embodiments, music may be automatically composed in a variety of distinct musical styles. The user preferably is presented with a variety of pre-set musical styles, which the user may select. As a particular example, the user may select a particular style from a collection of styles (as will be explained hereinafter, styles may be arranged as "style mixes" and within a particular style mix one or more particular styles, and optionally substyles or "microstyles"). After selection of a particular style or substyle, with a preferably single button push (e.g., play) the system begins automatically composing music in accordance with the particular selected style or substyle. Thereafter, the user may interact with the auto-composed music of the selected style/substyle to modify parameters of the particular music, and via such modifications create new music of the particular musical style/substyle. In order to facilitate the creation of music of a desirable quality consistent with the selected style/substyle, the system preferably controls which parameters may be modified by the user, and the range over which such parameters may be changed by the user, consistent with the particular musical style/substyle. The system preferably accomplishes this via music that may be represented in a form to be readily modified or used in an auto-composition algorithm or the like. The musical data representation, and accompanying rules for processing the musical data, enable music to be auto-composed and interacted with in a manner that presents reduced processing and/or storage requirements as compared to certain conventional audio storage techniques (such as CD audio, MP3 files, WAV files, etc.).

The system architecture of certain preferred embodiments includes a microprocessor or microcontroller for controlling the overall system operation. A synthesizer/DSP is provided in certain embodiments in order to generate audio streams (music and audio samples, etc.). Non-volatile memory preferably is provided for storing sound banks. Preferably removable non-volatile storage/memory preferably is provided to store configuration files, song lists and samples, and in certain embodiments sound bank optimization or sound bank data A codec preferably is provided for receiving microphone input and for providing audio output. A radio tuner preferably is provided so that output from the radio tuner may be mixed, for example, with auto-composed songs created by the system, which preferably includes a virtual radio mode of operation. The system also preferably includes hardware and associated software that facilitates the storing and sharing of songs and song lists and the updating of sound banks and the like that are used to create musical compositions.

In certain embodiments the processing may occur in a client/server architecture, e.g., wherein a server is configured to provide the processing computation resources, and a client (e.g., a personal computer, or a communications device) is configured to provide a user interface.

In alternative embodiments, the hardware, software, musical data structures and/or user interface attributes are adapted to, and employed in, a variety of applications, systems and processes in which such music creation may be utilized.

In accordance with certain preferred embodiments of the present invention, problems associated with broadcast music are addressed by providing systems and methods for broadcasting music, and more particularly systems and methods employing data-file-based distribution, in which at least portions of the music can be generated by a node/subscriber unit upon reception of a data file, which is processed using a music generation system, which preferably plays music based on the data file. The present invention preferably makes use of node-based music generation. In certain alternative embodiments, by incorporating the generation of the music into a node/subscriber unit, certain of the bandwidth-intensive techniques of the prior art can be avoided. Consequently, the bandwidth also can be used for things such as node-to-node and node-to-base music data transmission features. For example, the node may create or modify a previously received or generated data file from which music may be generated, and the data file created or modified data file may be transmitted from the node to another node, or from the node to a base station, where it may be broadcast or transmitted to one or a plurality of nodes. In certain embodiments, the present invention is characterized by a relatively small data file transmission that contains various parameters sufficient to describe or define the music that subsequently will be generated. Such a file preferably is then received and used by one or more node/subscriber units to render the music using various music generation and signal processing functions.

In accordance with presently preferred embodiments of the present invention, problems associated with audio synthesis in a portable environment are addressed by providing systems and methods for performing audio synthesis in a manner that preferably simplifies design requirements, minimizes cost, while preferably providing quality audio synthesis features targeted for a portable system (e.g., portable telephone, personal digital assistant, portable video game, etc.).

Such aspects of the present invention will be understood based on the detailed description to follow hereinafter.

BRIEF DESCRIPTION OF THE DRAWINGS

The above objects and other advantages of the present invention will become more apparent by describing in detail the preferred embodiments of the present invention with reference to the attached drawings in which:

FIGS. 6 & 7 illustrate exemplary data transfer formats and features utilized in connection with certain preferred embodiments of the present invention;

FIGS. 28-29 illustrate the use of Non-Registered Parameter Number for purposes of synchronizing MIDA events and audio samples in accordance with certain preferred embodiments of the present invention;

FIG. 35 illustrates exemplary preferred music data file utilized in accordance with certain embodiments of the present invention;

FIG. 37 illustrates certain of the exemplary communications standards associated with cellular data transmission/reception services utilized in accordance with certain embodiments of the present invention;

FIG. 38 illustrates certain exemplary excerpts from IS-637, as preferred examples of aspects of a broadcast format utilized in accordance with certain embodiments of the present invention.

DETAILED DESCRIPTION OF EXEMPLARY PREFERRED EMBODIMENTS

The present invention will be described in greater detail with reference to certain preferred and certain other embodiments, which may serve to further the understanding of preferred embodiments of the present invention. As described elsewhere herein, various refinements and substitutions of the various elements of the various embodiments are possible based on the principles and teachings herein.

In accordance with the present invention, music may be created (including by auto-composition), interacted with, played and implemented in a variety of novel ways as will be hereinafter described via numerous exemplary preferred and alternative embodiments. Included in such embodiments are what may be considered as top-down approaches to musical creation. Top-down as used herein generally means that a complete song structure for quality music is created for the end user as a starting point. This enables the user to immediately be in position to create quality music, with the user then having the ability to alter, and thereby create new music, based on the starting point provided by the system. Where a particular user takes the music creation process is up to them. More conventional musical creation processes involve a bottom-up approach, wherein the rudiments of each instrument and musical Style are learned, and then individual notes are put together, etc. This conventional approach generally has the side-effect of limiting the musical creation to a small group of trained people, and has, in effect, barred the wider population from experiencing the creative process with music.

As used herein, the term 'ringtone' refers to a sound that plays on a device to alert a user of something, such as an incoming call, a message, etc. In addition 'ringtone' can refer to other types of alert tones, such as a ringback tone, which typically is a sound that is played by a service provider to an incoming caller while a communications device is ringing (e.g., in the case of a phone, the ringing that occurs before the phone is answered).

In accordance with the present invention, various systems and methods are provided that enable users to create music. Such systems and methods desirably utilize intuitive and easy to learn and to use user interfaces that facilitate the creation of, and interaction with, music that is being created, or was created previously. Various aspects of one example of a preferred embodiment for a user interface in accordance with certain preferred embodiments of the present invention will now be described.

As will be appreciated by one of ordinary skill in the art, other related combinations can be employed along these lines to provide additional features without detracting from the usability of the device, and without departing from the spirit and scope of the present invention.

Various examples of preferred embodiments of the client/server music mixer architecture will now be described.

Figure 1:
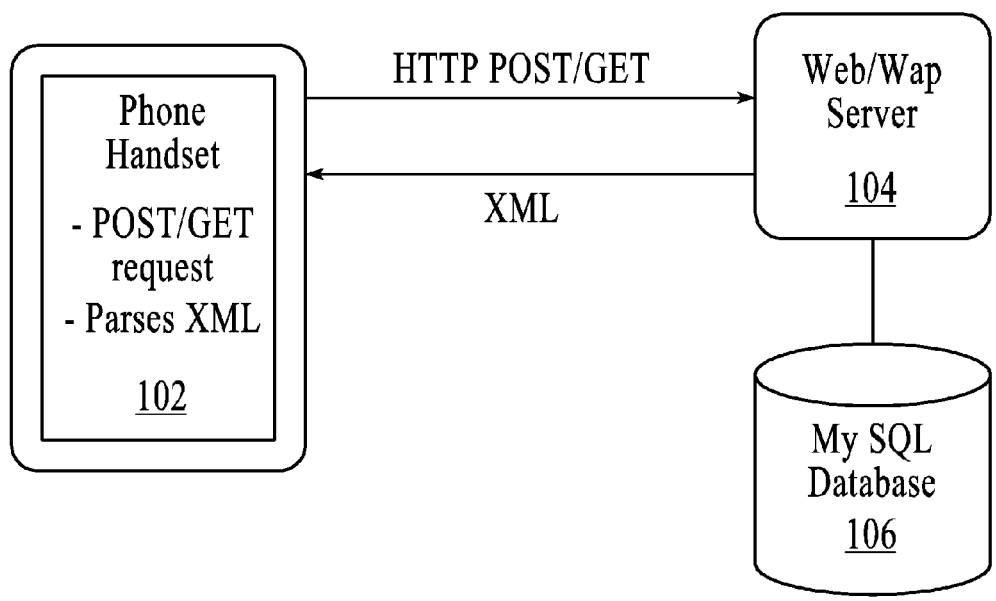
FIGS. 1-3 illustrate exemplary preferred architectures utilized in connection with certain preferred embodiments of the present invention.

FIG. 1 illustrates a communications device such as a Handset 102 in communication with a Server 4, wherein the Server 104 includes (or has access to) a database such as a structured query language (SQL) Database 106. As depicted, Handset 102 preferably sends requests to Server 104 using a protocol such as HTTP Post or Get commands. Server 104 preferably responds to such commands with data formatted in XML (eXtended Markup Language transmitted through HTML) or, in certain alternative embodiments, the data may be formatted in MIDI. In this example, Server 104 is a web and/or wap server, wherein the web access may be from a client attached to the web (such as a personal computer, etc. with web access), and wherein the wap access may be from a client attached via the wap protocol (e.g., such as a cellular phone with wap access).

Figure 2:
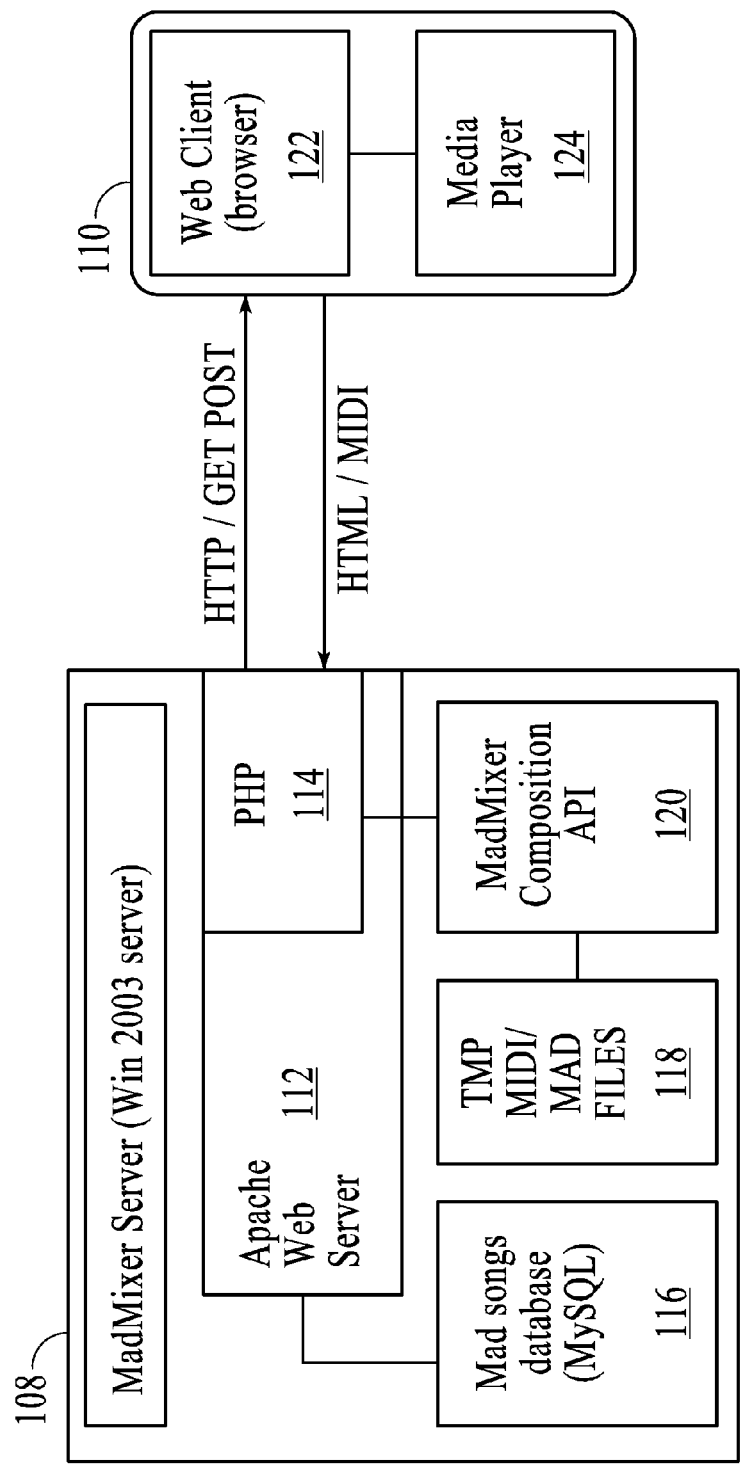

FIG. 2 illustrates certain exemplary embodiments of a primarily server-based music remix architecture, that preferably may be used to remix ringtone (e.g., ringback tone) alert tones for download and use by a portable communications device such as a cellular telephone. As depicted, Server 108 is in communication with client 110, wherein server 108 incorporates web server functional block 112, PHP ("PHP Hypertext Preprocessor", an open source, server-side, HTML embedded scripting language used to create dynamic Web pages) functional block 114, database 116, temporary memory functional block 118, and music composition block 120, and wherein client 110 incorporates web browser function 122 and media player functional block 124. As will be evident to one of skill in this field, FIG. 2 illustrates a primarily server-based music remix architecture, as the Mixer composition block is located on server 108.

Figure 3:
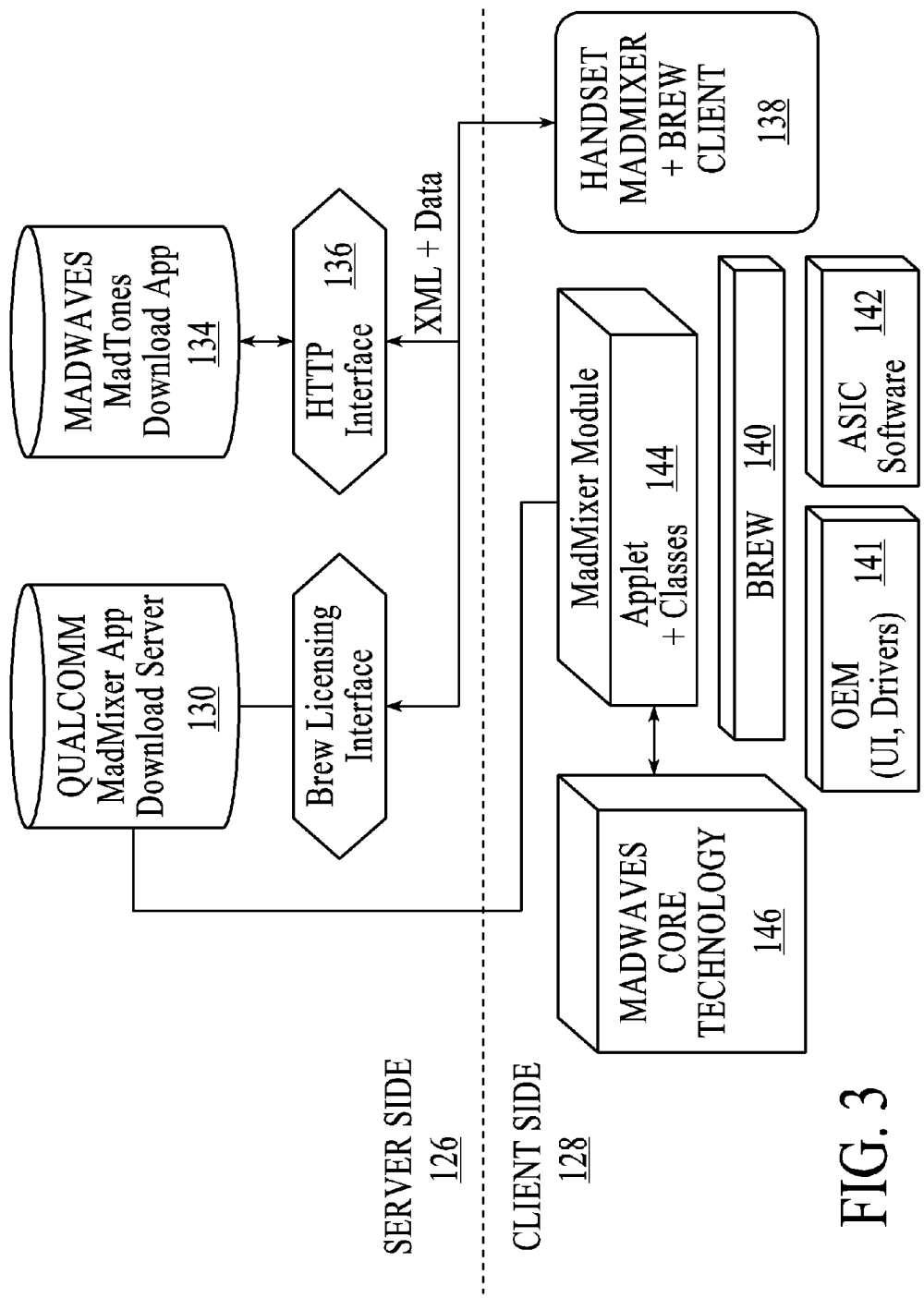

FIG. 3 illustrates certain exemplary embodiments of a primarily client-based music remix architecture, that similarly may be used to remix music (such as ringtone alert tones). As illustrated in FIG. 3, the server-side of the functional architecture is depicted as server-side 126, and the client side of the functional architecture is depicted as client-side 128. Server-side 126 incorporates Application Download Server 130 in connection with licensing interface 132, and Tones download application 134 in connection with HTTP interface 136. On the client-side 128, mixer module 144 functional block is depicted in communication with Application Download Server 130, and Handset Mixer client 138 is depicted in communication with both licensing interface 132 and HTTP interface 136. Furthermore, client-side 128 incorporates BREW functional block 140, OEM (UI, Drivers) Functional block 141, and ASIC Software 142. Finally, as depicted in FIG. 3, client-side 128 incorporates core technology 146 in connection with mixer module 144. As will be evident to one of skill in this field, FIG. 3 illustrates a primarily client-based remix architecture, as the mixer module 144 and core technology 146 functional blocks are located on the client-side 128.

The architectures of FIGS. 2 & 3 may each be used in connection with certain other teachings elsewhere herein to enable the creation and/or remixing of music. In certain situations the architecture depicted in FIG. 2 (e.g., primarily server-based) may be preferred, as the music creation/remixing algorithmic processing is more centralized. In other situations, the architecture depicted in FIG. 3 may be preferred, as it is more decentralized and distributed. Depending on where processing overhead may be at a premium, as well as other factors such as transmission medium available bandwidth, security, memory resources, processing resources, etc., the primarily server or primarily client-based approach may be preferable. In addition, in certain situations it may be preferable to employ a hybrid approach, e.g., wherein a portion of the music creation/remixing processing is performed at both the server and the client. It is expected that this alternative hybrid approach may be particularly useful in situations where the efficiencies of decentralized processing are desired, while the benefits of centralized content are also desired. In keeping with this alternative example, such a hybrid may be depicted similarly to FIGS. 2 & 3, with the notable exception that a music creation and/or remixing functional block may be bifurcated between the client and the server.

Various examples of preferred embodiments related to user selection, download, and/or purchase of musical pieces (e.g., ringtone alert tones) of the present invention will now be described.

Figure 4:
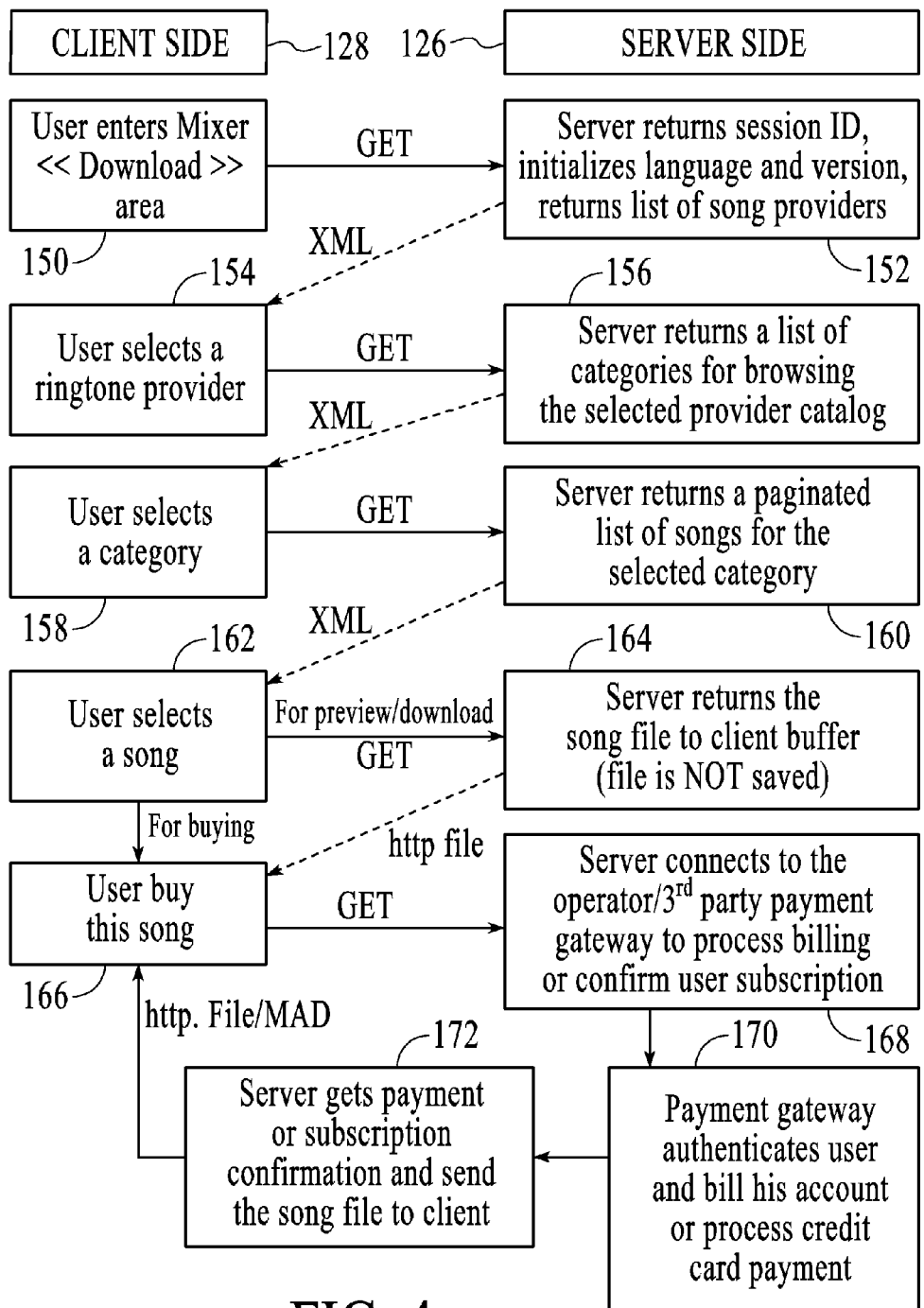
FIG. 4 illustrates an exemplary music download flowchart utilized in connection with certain preferred embodiments of the present invention.

FIG. 4 depicts the flow user and server actions during the course of selecting, listening and buying a piece of music. This exemplary flow is of benefit in multiple architectures described above (e.g., primarily client-based, primarily server-based, and hybrid), as it is focused on user selection and purchase aspects of a musical piece, and not the creation/remixing aspects. Server-side 126 represents the actions of the server during a selection/purchase process; client-side 128 represents the actions of the client (e.g., a personal computer via a browser, a cellular phone, etc.).

To begin with, the flow chart depicts step 150 wherein a user preferably enters a Mixer "download" area by issuing an HTML GET command to the server via an architecture as described elsewhere in the present disclosure (e.g., see FIGS. 1-3). At step 152, the server preferably returns session identification information, initializes language and version settings, and returns a list of song providers via an XML (eXtensible Markup Language) formatted communication. At step 154, the user preferably selects a ringtone provider (e.g., when there may be a plurality of providers available) via an HTML GET command. At step 156, the server preferably returns a list of categories for browsing the selected provider catalog via an XML formatted communication. At step 158, the user preferably selects a category via an HTML GET command, and at step 160 the server preferably returns a paginated list of songs for the selected category via an XML formatted communication. At step 162 the user preferably selects a music piece such as a song, and (a) the user preferably may preview the song via an HTML GET request, wherein at step 164 the server preferably returns at least a portion of the song file to a memory location on the client (e.g., without allowing a save of the portion) via a HTTP (hypertext transfer protocol) formatted communication; and/or (b) the user preferably may buy the music piece at step 166 via an HTML GET command issued to the server, wherein at step 168 the server may access a payment function (e.g., a 3rd party payment gateway), to process billing, and/or confirm user subscription parameters. At this stage, as depicted in step 170, the payment function preferably may authenticate the user and/or bill the user account, process payment, etc. At step 172, the server preferably receives payment and/or subscription confirmation and may send the music piece file to the client, such as via an HTTP transfer. In certain other examples, the preview download feature may not be preferable before the payment process occurs.

Figure 5:
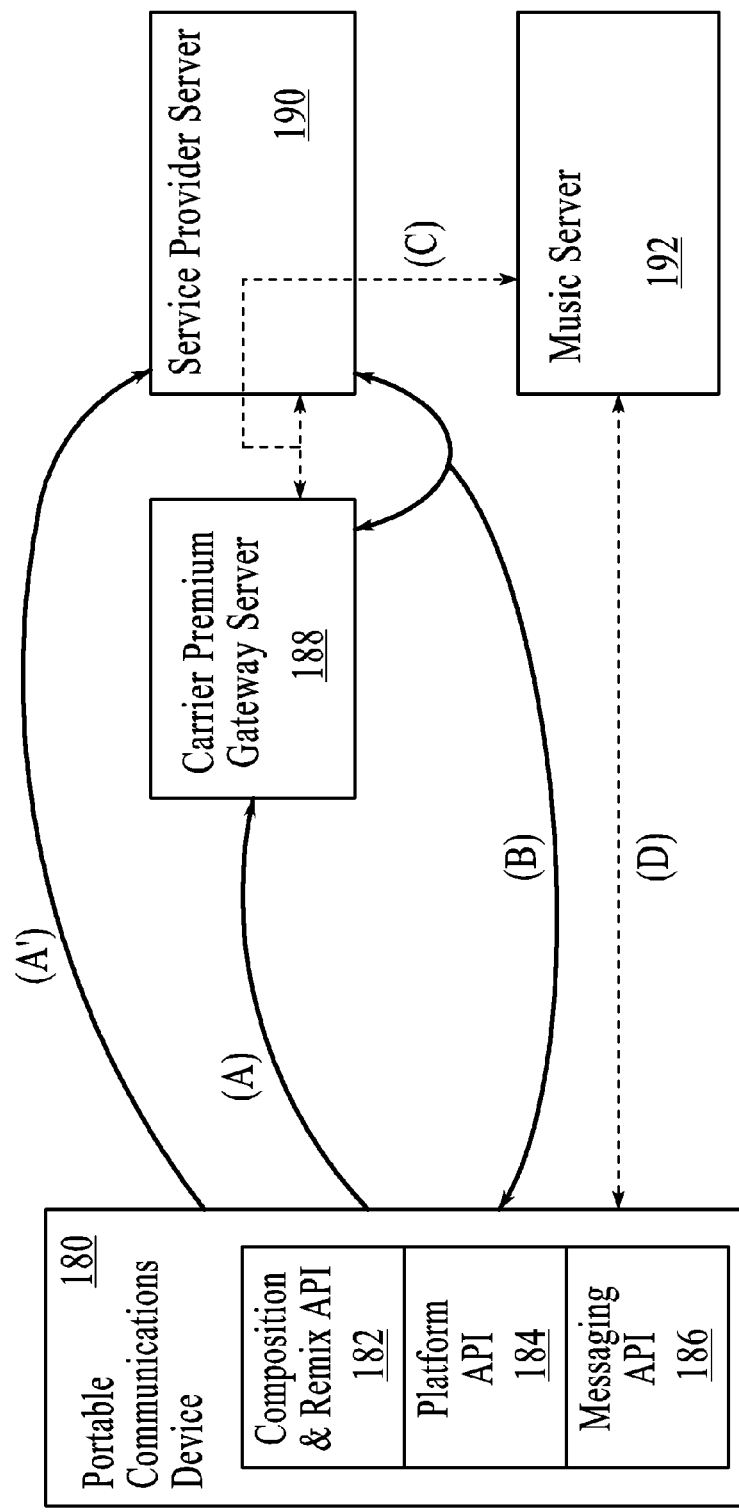
FIG. 5 illustrates exemplary preferred architectures and flowcharts utilized in connection with certain preferred embodiments of the present invention.
Figure 8:
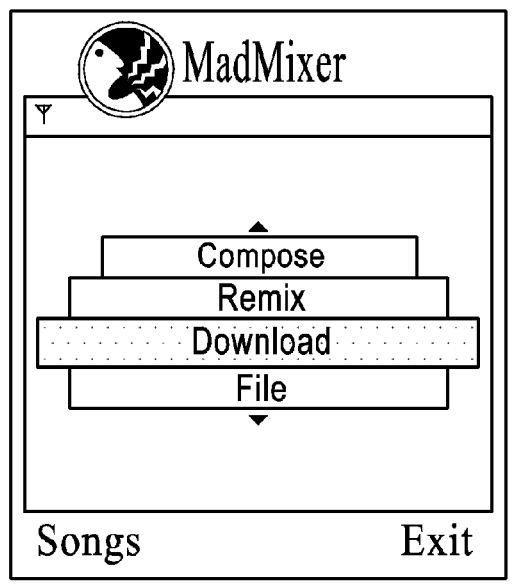
FIGS. 8-22 illustrate exemplary user interface features and user functions utilized in connection with certain preferred embodiments of the present invention.

FIG. 5 depicts certain aspects of the present invention related to an alternative payment model. As illustrated, portable communications device 180 (e.g., a cellular telephone) contains composition & remix API (application program interface) functional block 182, platform API functional block 184 (e.g., JAVA), and messaging API functional block 186 (e.g., SMS—short message service, described elsewhere herein in connection with FIGS. 37-38). As illustrated at step (A), portable communications device 180 preferably transmits a message (e.g., such as a MO SMS—mobile originated SMS) to a server 188 (e.g., a carrier premium gateway server). In this example, the MO SMS at step (A) preferably may include a transaction ID, along with other information, that together may be used by a carrier premium gateway server 188 to allow the server 188 to cause a billable item to appear on a customer's next invoice or bill. The use of a premium gateway is a means to preferably allow a user to purchase music services and/or products using portable communications device 180 from a third party (i.e., other than the carrier), and for the billing of such services and/or products to be incorporated into the carrier's normal bill to the user, e.g., in a section of the bill identified as third party services and/or products. As depicted in FIG. 5, upon successful billing validation, at step (B) a message preferably is sent (e.g., in this example, from server 188) to portable communications device 180, preferably in a form such as a Mobile Terminated SMS (MT SMS) that preferably may include some instruction (e.g., such as a URL instruction that preferably may allow a WAP push to occur) that preferably will allow portable communications device 180 to access music server 192, e.g., as depicted in step (D). In certain embodiments it may be preferable to incorporate an additional step between (B) and (D) that will involve a communication from server 188 to music server 192, such as a HTTP GET command that preferably may place music content data at a location (e.g., the location indicated by the URL instruction sent to portable communications device 180 at step (D)). In this fashion it is expected that a relatively secure means is available to bill a user for music data (e.g., remixable format ringtones) that may be downloaded by a user. In certain variations, there may be a service provider server involved in the process as well, as illustrated in FIG. 5 by service provider server 190, and the alternative step (A'). Step (A') illustrates certain aspects wherein a request may be made to a service provider server 190, e.g., instead a carrier premium gateway server 188, as is depicted in step (A). In this fashion, service provider server 190 preferably may perform some intermediary function between portable communications device 180 and carrier premium gateway server 188, or may subsume the role of server 188, and allow steps (B), (C) and (D) to occur.

Figure 17:
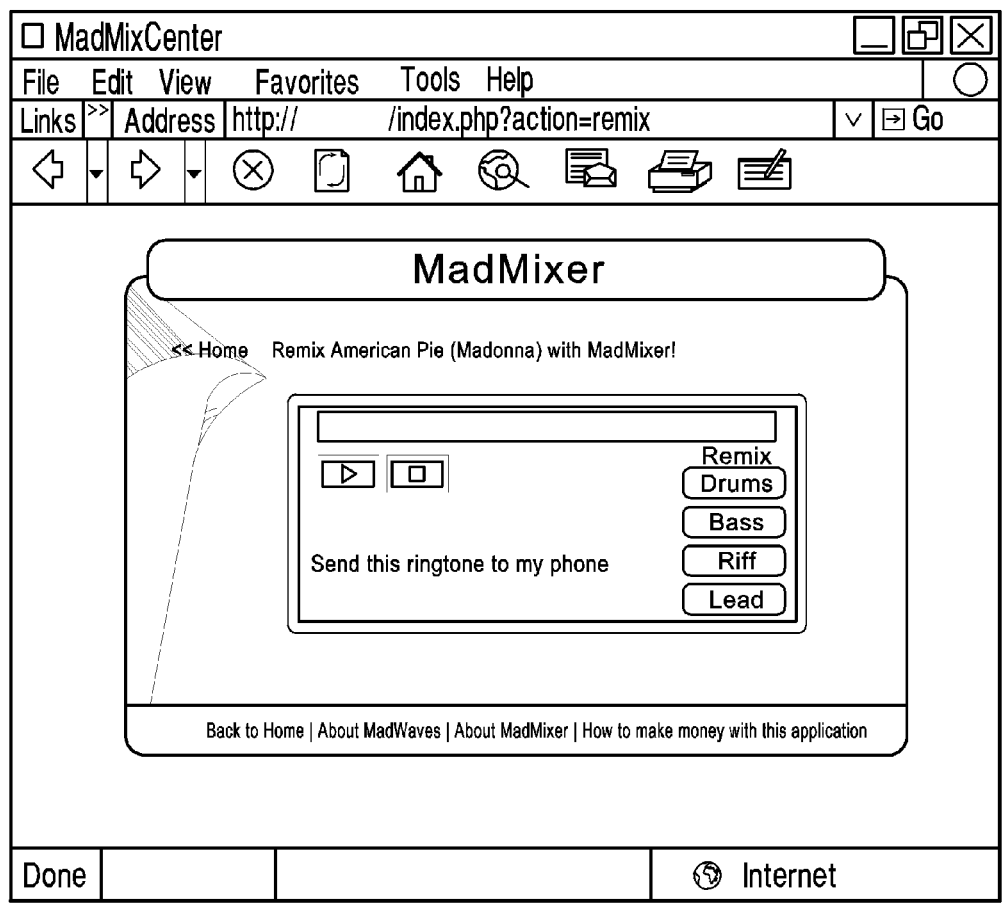
Figure 19:
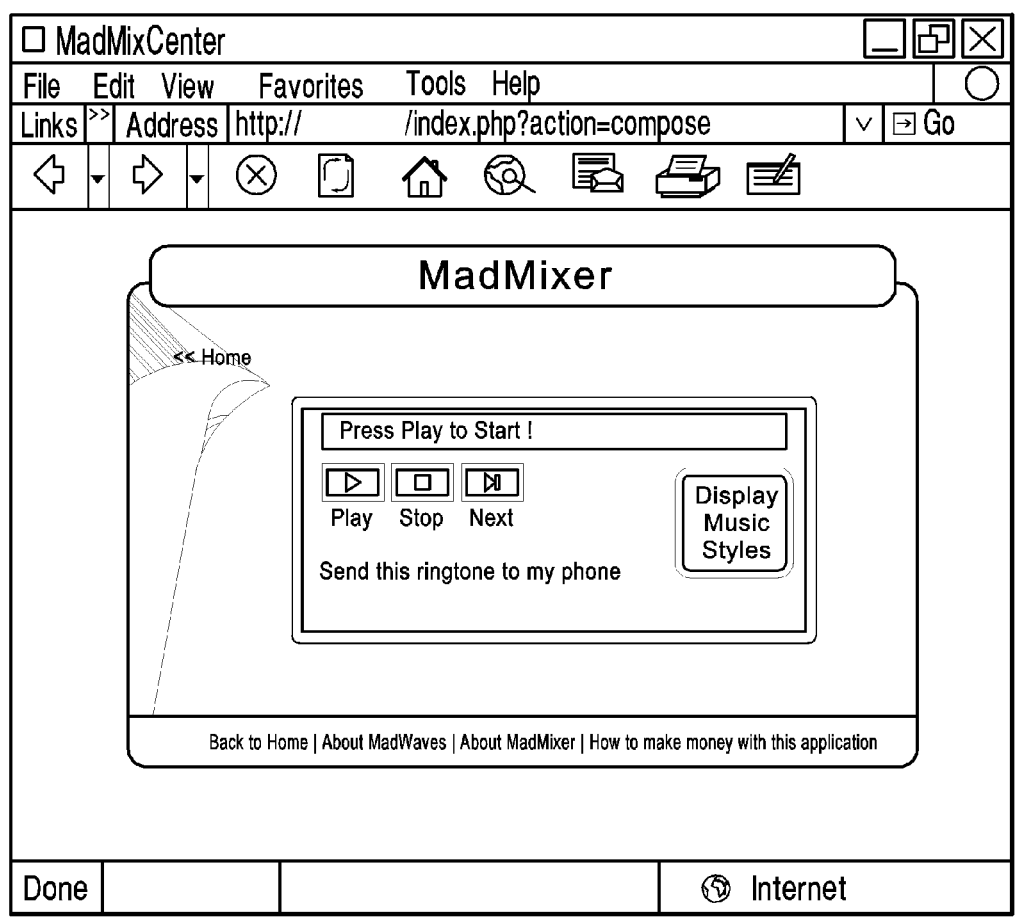
Figure 20:
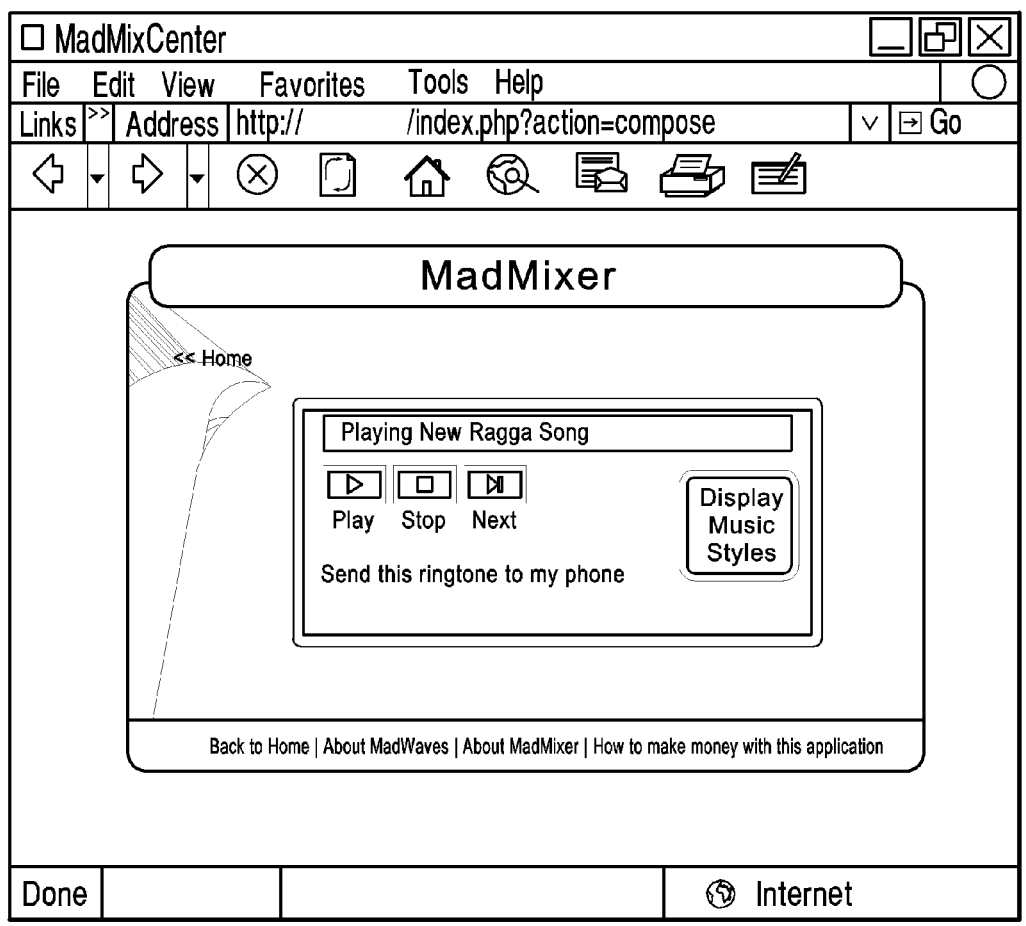

Certain aspects illustrated in FIG. 5 preferably may be used in additional variations. For example, step (D) may simply follow a credit card authorization process, such as with the use of an additional step wherein the music server 192 communicates with a bank server (not shown) to process verification of credit card related information communicated from a user; in certain cases such credit card information preferably may be entered by a user into portable communications device 180, or in other cases, this data preferably may be entered by a user into a web-browser based web page on a personal computer connected to the internet. In addition, in certain embodiments that also involve a pc-based remixer function, such as is discussed elsewhere herein in connection with a browser plug-in, certain aspects of the example of FIG. 5 may be of advantage to allow a user to access a remix function via a browser, and preferably initiate the steps (A) or (A') as depicted in FIG. 5 by way of, for example, a message sent from the browser remix application to the portable communications device 180 with some instruction to begin. Alternatively, in situations where the use of MO SMS and/or MT SMS may not be desired for the steps (A), (A') or (B), it may be preferable to allow a remix process to occur on a browser-based implementation (such as via a plug-in, etc.), and for an instruction to sent from the browser to music server 192 indicating that music data should be sent to portable communication device 180 (e.g., at step (D), and as indicated in FIGS. 17, 19, & 20 by the "send this ringtone to my phone" option in the browser user interface).

FIG. 6 illustrates an exemplary XML file that may be sent from the server side 126 to the client side 128 between step 154 and step 158. Similarly, FIG. 7 illustrates an exemplary XML file that may be sent from server side 126 to client side 128 between step 158 and step 162. As shown in these XML examples, the standard XML language may be used to great advantage in the communication of data back and forth between clients and server during music piece selection. Such exemplary teachings may be used in various embodiments such as PC-based remix, cellular phone based remix, etc., as well as primarily client-based remix, primarily server-based remix, or some hybrid architecture as discussed elsewhere herein.

Turning to FIGS. 7-20, several examples of preferable user interface features are disclosed that may preferably be displayed/configured with the aid of the XML-type messaging language described. As shown in these user-interface examples, it may be preferable to create the menu items in the user interface using the XML-formatted messages; e.g., to display the user interface of FIG. 10, it may be preferable to use a message formatted similarly to FIG. 7 (although the particular song titles may be different, etc.). Such "on-the-fly" navigation menu capabilities preferably provide a seamless experience for a user, while enabling a particularly adaptable and easily upgradable database menuing system for the server side. For example, as categories, styles, artists, etc., are updated in the database regularly, the use of XML to create at least a portion of the menu options available to a user can be readily appreciated.

Various additional aspects of preferred embodiments related to the client/user interface of certain embodiments of the present invention will now be described.

Figure 9:
Figure 10:
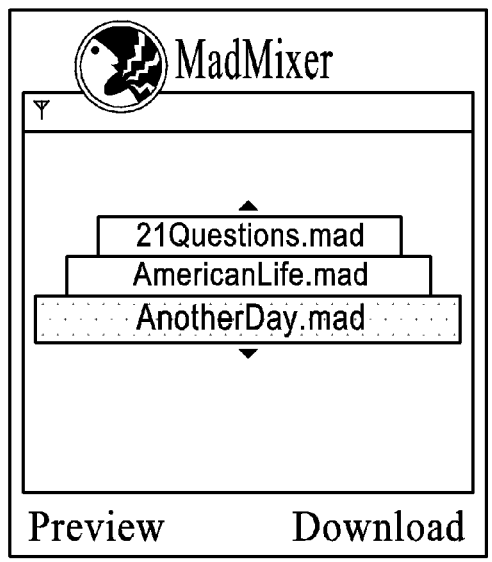

FIG. 7 depicts an exemplary user interface screen shot that may be present on a device such as a portable communications device. As illustrated, menus items such as "Compose", "Remix", "Download", and "File" may be provided, and a user may move between the items using an "up" or "down" input key. As shown, one menu item receiving the focus may be enlarged (e.g. see "Download" button). Accordingly, as the user moves the focus between each menu item, the item may be enlarged compared to the other items. Assuming the user selects "Download" at FIG. 7, FIG. 9 depicts an exemplary screen that may be in response. As depicted, FIG. 9 illustrates various menu items that preferably may relate to the "download" request, e.g., such as "top ringtones", "by artist", "be genre", "by song", and "search songs". Assuming that a user selects "by song", the example of FIG. 10 illustrates a list of song titles that preferably may be provided to the user. Such an exemplary screen shot as depicted in FIG. 10 preferably may be created using a file transfer such as the example depicted in FIG. 7, and preferably may be sent from server side 126 to client side 128 between step 158 and step 162 (referring to FIG. 4).

Figure 11:

FIG. 11 depicts an exemplary screen shot that preferably may be displayed after a song is selected (e.g., "another day mad" menu item as illustrated in FIG. 10). The particular example of FIG. 11 involves a "token" based approach, where the user may obtain a number of tokens in advance, and may use one or more to "buy" a song. An example of purchase functional block that may be used in such a fashion is licensing interface 132 in FIG. 3, discussed further elsewhere herein.

Figure 12:
Figure 13:
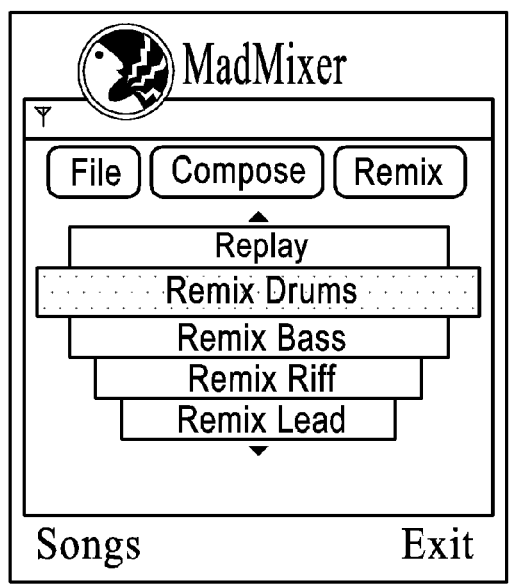

FIG. 12 depicts an exemplary screenshot that preferably may be used after a music piece is purchased/obtained. The user preferably is presented with menu options to use the purchased music piece, such as: "install as ringtone", "remix this ringtone", "download other songs", etc. Assuming that a user selects a remix option, FIG. 13 depicts an exemplary remix screenshot. As illustrated, menu items preferably are accessible for individual components of the music piece, such as: "remix drums", "remix bass", "remix riff", "remix lead", etc. In certain embodiments, such as may be preferable in portable communications devices including cellular telephone, a 'one-click' remix option can be used to great effect, e.g., to allow a user to easily and quickly remix at least a portion of the music. In FIG. 12, along the top of the screen are certain navigation-type items, with the "remix" item selected.

Figure 14:
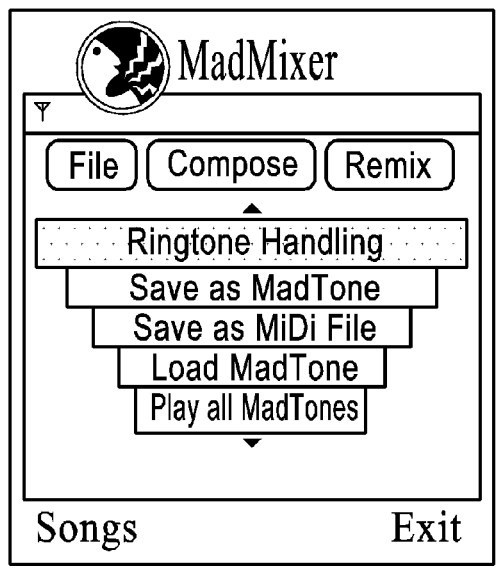

FIG. 14 depicts an exemplary user interface screen that preferably may be used when the "file" item may be selected; "ringtone handling", "save as MadTone", "save as Midi file", "load MadTone", "Play all MadTones", etc., are menu items that preferably may be used in connection with such a "File" management command of a remixer application. As used herein, "MadTone" refers to a remixable music file format. Assuming that a "Ringtone Handling" menu item preferably is selected by a user, a screen shot such as that depicted in FIG. 15 may be provided to a user. Notably, this screen shot illustrates the preferable option of providing the user with a "dynamic ringtone", such as is described elsewhere herein.

Certain aspects of the presently preferred embodiments may involve a personal computer on the side of the user. FIGS. 16-21 illustrate various exemplary features that preferably may be incorporated in a music remix service. As described elsewhere herein, it is expected that such personal computer implementations may preferably be configured for use in a variety of the presently preferred architectures, e.g., as described elsewhere throughout this disclosure. In particular, the discussion of primarily-server based, primarily-client based, and hybrid architectures preferably are suitable for various aspects of embodiments described herein involving personal computer based clients. In addition, certain aspects of embodiments may be particularly beneficial in certain situations, or less beneficial in other situations, as described elsewhere herein.

Figure 16:
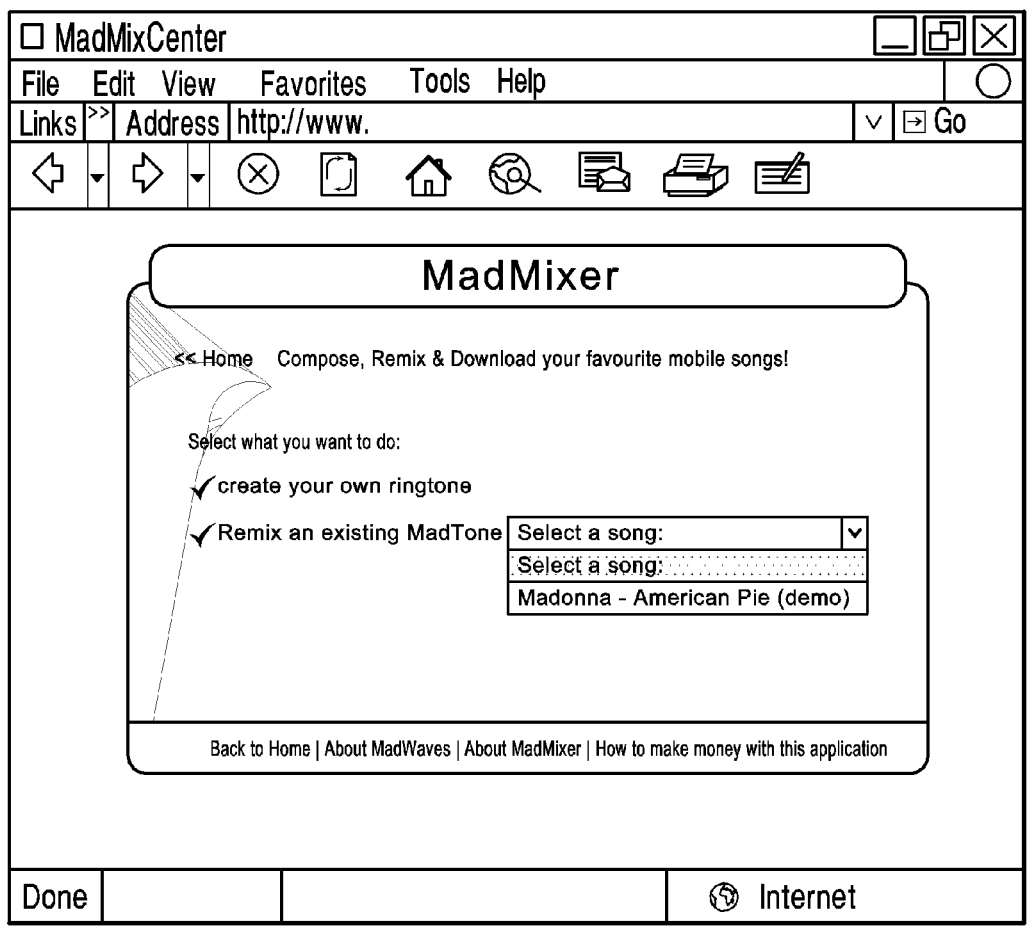

As depicted in FIG. 16, a web browser may preferably be configured to access a server webpage, such as the music remix web page example of FIG. 16. Preferably a user viewing the web page from a PC web browser may be given an option to create a new piece of music (e.g., ringtone), or to remix an existing piece of music, such as the example song "American Pie" as illustrated in FIG. 16.

FIG. 17 depicts an exemplary remix screen associated with the example piece of music "American Pie", e.g., that may be presented in response to a "remix" command at FIG. 16. As illustrated, the remix screen preferably may have a user interface to control aspects of the remix operation, such as the "drums", "bass", "riff", and "lead" buttons. Preferably, when a user selects one of these interface controls, a music autocomposition algorithm is instigated as described elsewhere below. The autocomposition algorithm preferably may reside primarily on the server, the client, or a hybrid of the two, and may preferably be interconnected to one or more 3rd part servers for purposes of music data provisioning, music subscription/purchase validation, etc. Furthermore, FIG. 17 illustrates the preferable option of providing a button for allowing the user to send the music (e.g., ringtone) to a communications device (e.g., cellular telephone handset).

Figure 18:
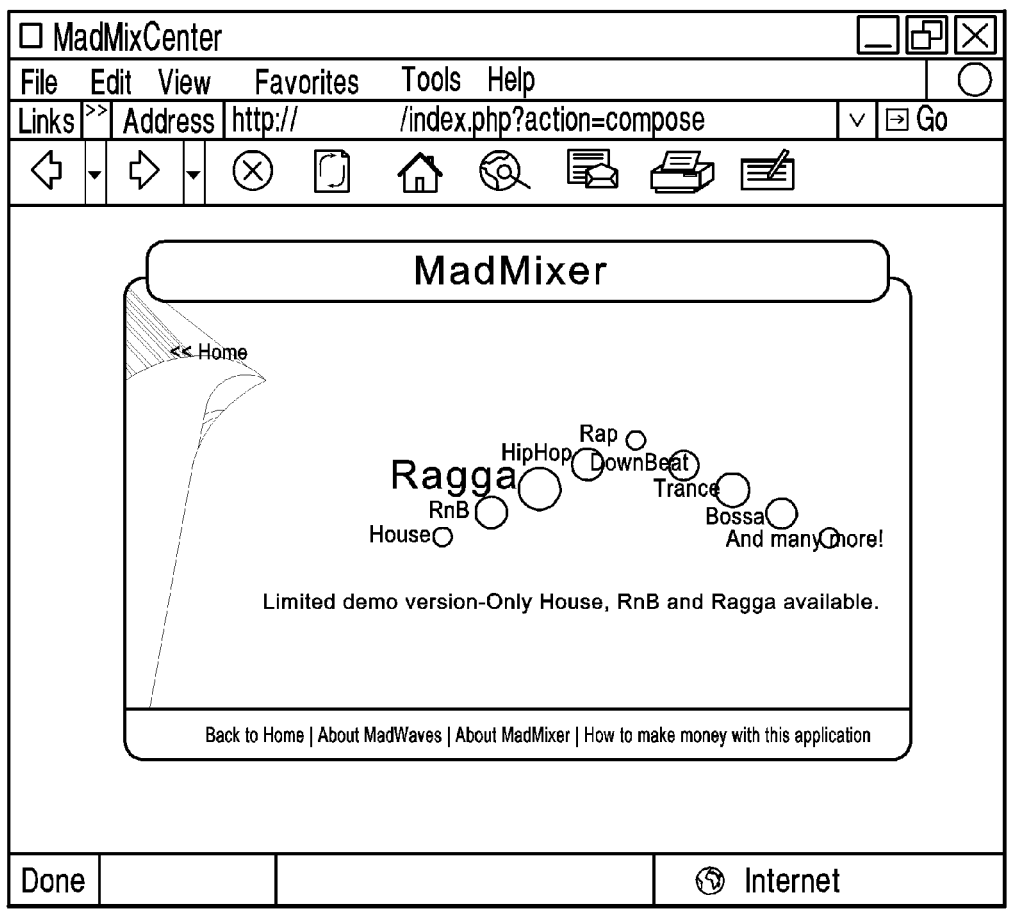

FIG. 18 depicts an exemplary interface to create a new piece of music, e.g., that may be presented in response to a "create" command issued at FIG. 16. As illustrated, the user may be presented with a variety of selections, such as styles/microstyles, with which the autocomposition algorithm preferably may use to create a new music piece. FIG. 18 depicts a plurality of available styles, with a "ragga" style selected. FIG. 19 illustrates a user interface screen that preferably may follow such a style selection of FIG. 18. Preferably a user may be provided with an interface control to "play", "pause", and/or "stop" a music piece playback. FIG. 20 depicts a user interface screen that preferably may follow a "play" input command at FIG. 19. As illustrated in FIG. 20, the interface preferably indicates that the song is "now playing" during playback. As depicted in FIG. 17, it may be preferable to provide a button for allowing the user to send the ragga music (e.g., ringtone) to a communications device (e.g., cellular telephone handset).

Figure 21:
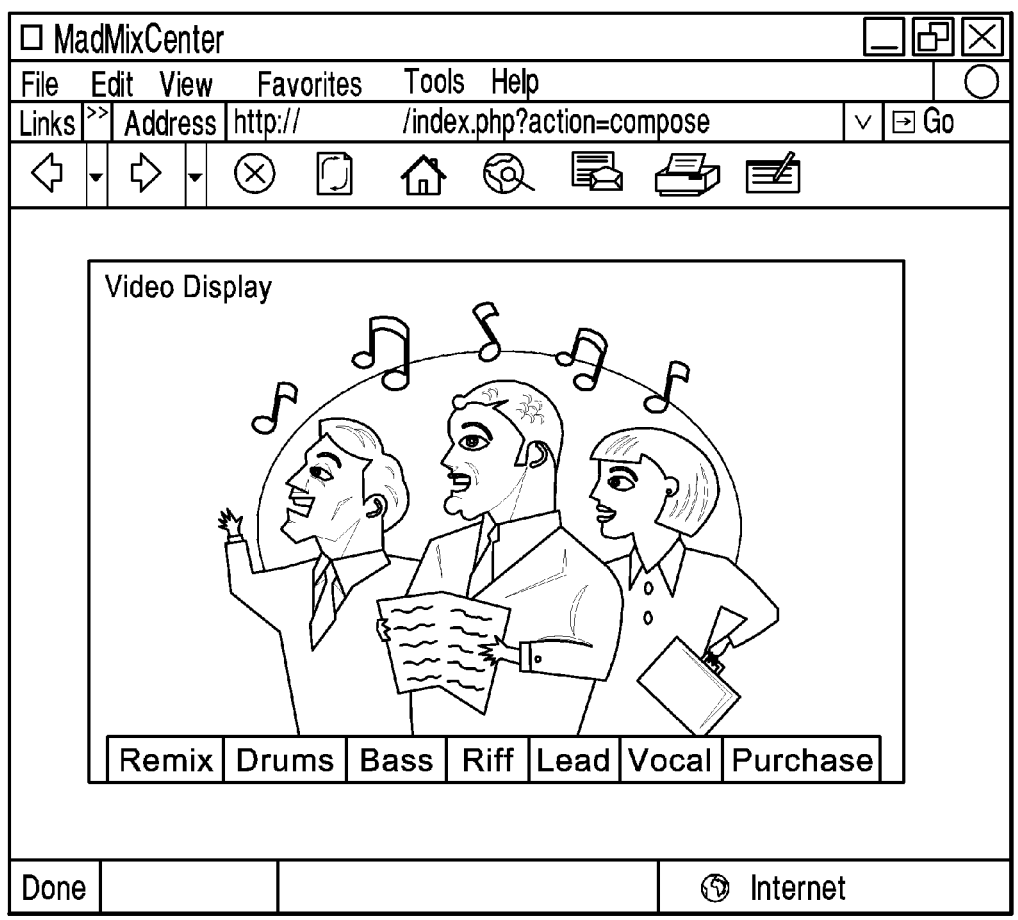
Figure 22:
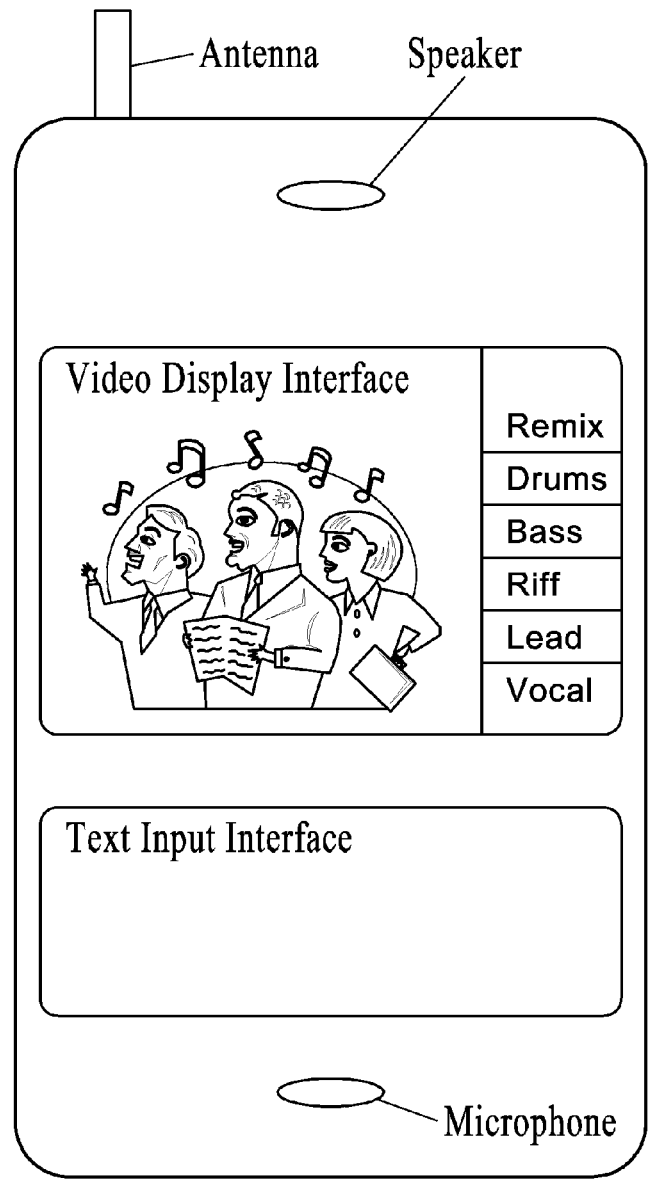

FIG. 21 depicts an additional presently preferred embodiment involving a video component to the music piece. In such a video remix function, it is preferable to adapt the music remix capabilities with a video display, e.g., a music video, an animation, a light show, etc. In certain embodiments it is preferable to synchronize the video component with the audio component, e.g., as described elsewhere herein with respect to video displays. FIG. 21 depicts a video display interface portion of a web page that preferably may contain a plug-in video resource (e.g., a streamed video resource such as available from Real Networks, Inc.). In addition, FIG. 21 depicts user interface music remix instructions (e.g., "drums", "bass", "riff", and "lead") that preferably may be configured similarly to the other remix interface embodiments described elsewhere herein. The user interface example of FIG. 21 preferably may further be adapted to provide an interface for targeted marketing/advertising associated with the music, and/or an option for the user to select to purchase the music. FIG. 22 illustrates certain aspects of the embodiments depicted in FIG. 21, with the notable difference that FIG. 22 involves a portable communications device as the client system. As discussed elsewhere herein, a music file with a video component preferably may be used as an alert tone, and/or may be sent from one client/user terminal to another.

The example of FIG. 21 illustrates a web browser-based user interface. Examples of how such a user interface preferably may provided to a user involve a plug-in, such as can be supplied via Active X (a set of platform independent technologies developed by Microsoft that enable software components to interact with one another in a networked environment, such as the Internet). Continuing this example, a plug-in preferably may incorporate one or more of the following: a soundbank (e.g., a wavetable-based DLS soundbank), a synthesizer algorithm (e.g., a synthesis digital signal processing function as is discussed elsewhere herein, such as in connection with one or more aspects of FIGS. 25, 26, 27, 34, and 39), and/or a MIDI sequencer function (e.g., as is discussed elsewhere herein). Preferably such a plug-in may be called (e.g., executed) from instructions (e.g., javascript instructions) located on a web page. In certain embodiments, a video portion (e.g., cartoon, animation, still pictures, slideshow, moving pictures, electronic greeting card, etc.) may be displayed in the video display example illustrated in FIGS. 21 & 22. In certain embodiments it may be preferable to stream the video portion (e.g., from a video streaming server). In this fashion it is possible to allow a plug-in to be loaded on a user's system that preferably does not have the entire video portion integrated, e.g., so that the load time will not be as long. Furthermore, in certain of these embodiments it may be preferable to incorporate, or make use of, certain parameters in the video data, to preferably allow the video portion to be synchronized with the audio content (i.e., such that the rhythmic integrity of the audio is maintained at the expense of the video, if necessary); wherein such audio content preferably is generated via the plug-in (or in the case of certain embodiments, the music remix algorithm may not be loaded via a plug-in, but by some other means). In addition to the foregoing discussion, it may furthermore be preferable in certain embodiments, such as depicted in FIGS. 21 & 22, to allow a soundbank (e.g., a DLS-downloadable sound bank) to preferably be included in the plug-in, or in certain alternative embodiments, to be downloaded by the plug-in. In such examples, it may be preferable to incorporate vocal sounds, speech sounds, and/or one-shot samples (e.g., samples that may be played in the music only occasionally) into the soundbank, and to trigger them in the same manner as the other sounds, e.g., via MIDI commands such as may be generated by a MIDI sequencer algorithm, as discussed elsewhere herein. In certain of these embodiments, it is preferable to package one or more of the components discussed herein (e.g., such as a DLS soundbank with vocal sounds, a link to a stream video that may include synch parameters, etc.) in an XMF formatted data communication, e.g., that may be accessed by a plug-in.

In many of the examples used herein involving a server with some remix/composition function, it maybe advantageous to provide a "black box server" type of composition algorithm, e.g., in situations where a variety of different types of clients (such as phones, personal computers, home stereo equipment, vehicle entertainment computing systems, etc.) may be accessing the same server. In such cases, the server preferably may be adapted to work in tandem with various clients, with assorted capabilities. In certain embodiments it may be preferable to include client related version and/or class information parameters in the data information transmitted to a remix server, e.g., that preferably indicates what class of device and/or what capabilities may exist on the client, to preferably allow the server to respond appropriately.

Various examples of preferred embodiments of the Music Rules used in the creation and/or remix of a music piece (e.g., ringtone alert tone) of the present invention will now be described.

Figure 23:
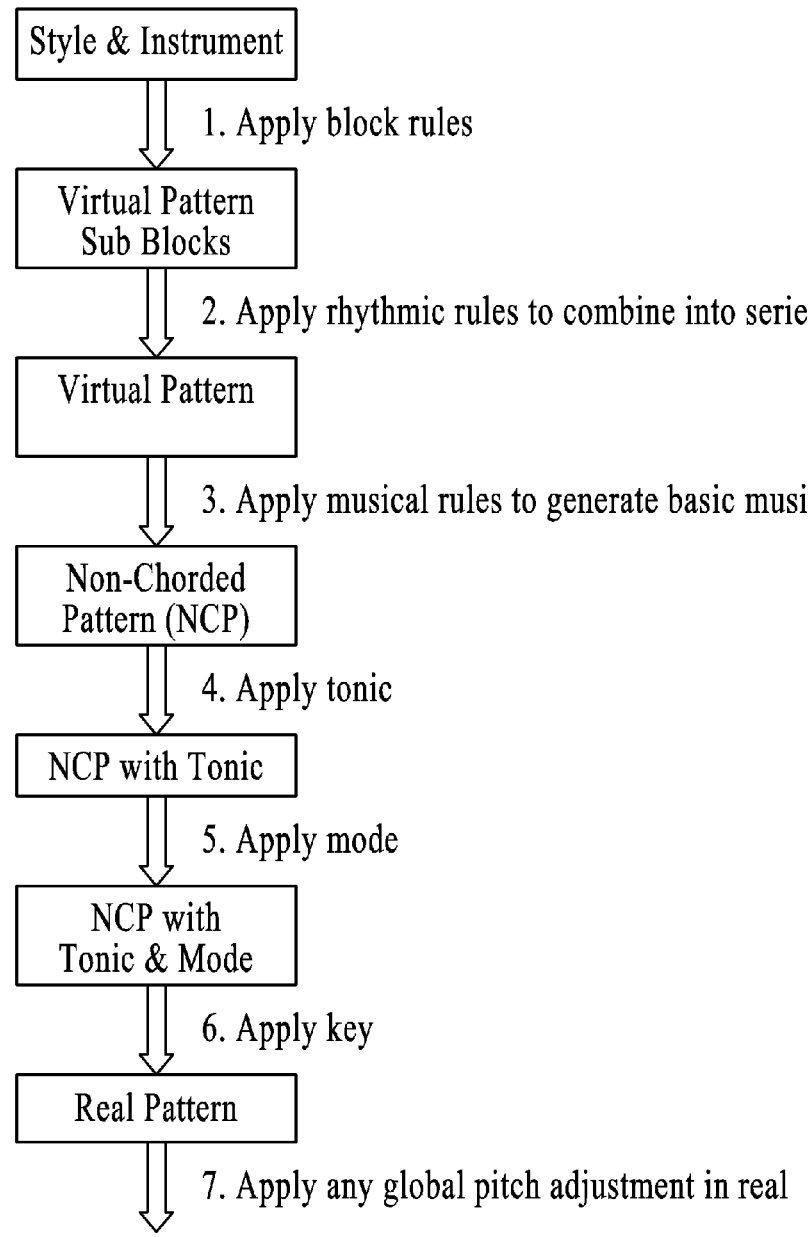
FIG. 23 illustrates an exemplary preferred musical generation flow utilized in certain preferred embodiments of the present invention.

FIG. 23 is a flow diagram depicting a general overview of a preferred approach to generating music in the context of the present invention. Starting at step 1, a style of music and a selected instrument are defined or loaded. Once the style of music and the type of instrument are known, the algorithm can apply Block rules to develop individual virtual pattern sub-blocks (e.g., those shown in FIG. 23). In certain alternative embodiments, the individual virtual pattern sub-blocks preferably are selected from a list or other data structure.

Figure 24:
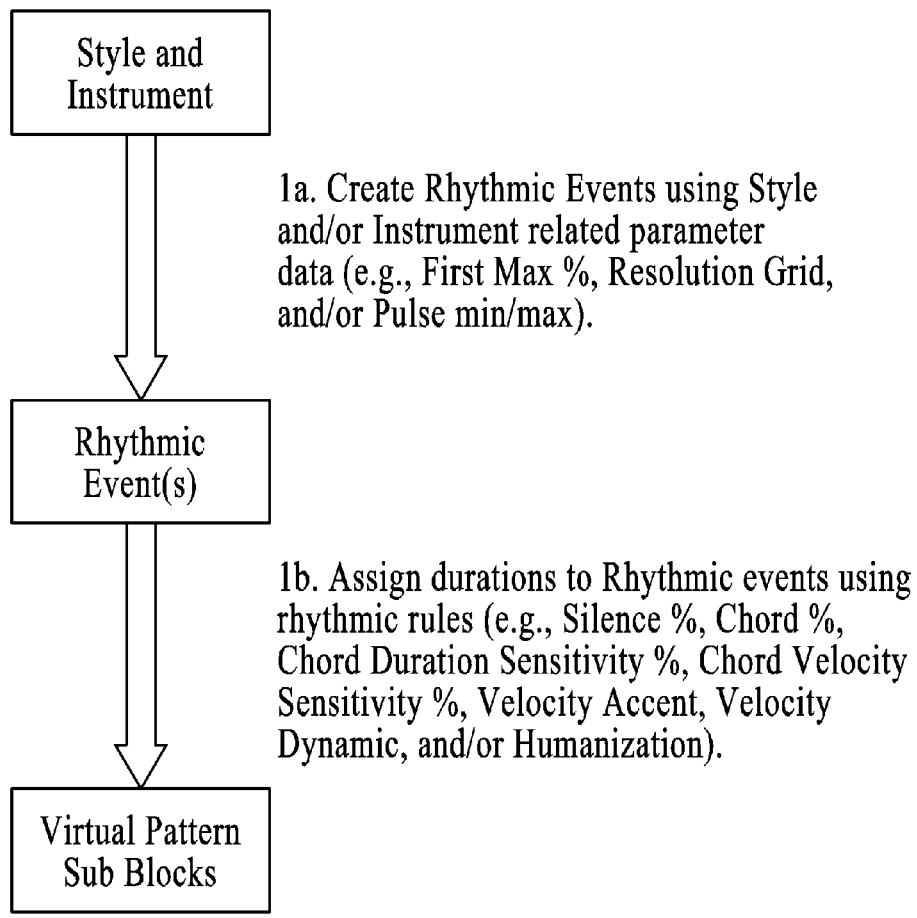
FIG. 24 illustrates an exemplary preferred musical generation flow utilized in certain preferred embodiments of the present invention.

In a presently preferred embodiment, the sub-block data is preferably created as needed during the algorithmic processing of music generation. FIG. 24 illustrates an alternative implementation of FIG. 23, step 1.

As illustrated in FIG. 24, step 1a, Style and Instrument related data are input into the algorithmic routine to create compatible rhythmic events. As one example, a "first max %" parameter may be used as an input to indicate how often a rhythmic event occurs in the first beat of the measure/period. A relatively high first max percentage may indicate that the selected instrument will usually sound a note at the beginning of the measure or period in the selected style; a relatively low first max percentage may indicate that the selected instrument will usually not sound a note at the beginning of the measure or period in the selected style. As another example, a "resolution grid" parameter may be used as an input to indicate the typical locations for rhythmic events in a given instrument and style. The resolution grid may indicate that a snare drum instrument will typically sound on the second and fourth beats in a four beat measure for a rock style. As another example, a "pulse min/max" parameter may be used as an input to indicate the range of tempo desired for a particular style of music. Many other input parameters can be used in a manner consistent with the present invention; at this point in the presently discussed embodiment, the point is to assemble a set of rhythmic events for a given instrument and style. At this point in the algorithmic example, the rhythmic events preferably are simply points in time that a note event will start. Preferably, other aspects of the note, such as duration, velocity, etc., are not yet known.

As illustrated in FIG. 24, step 1b, after rhythmic events (e.g., note start events) are algorithmically generated based on style and instrument parameter inputs, the algorithm preferably assigns durations to the rhythmic events using rhythmic rules. Preferably, the rhythmic rules operate on the rhythmic events generated in step 1a using additional style and/or instrument parameters such as "silence %", "chord %", "chord duration sensitivity %", "chord velocity sensitivity %", "velocity accent", "velocity dynamic", and/or "humanization", as examples. Silence % may be used to indicate the percentage of time during a measure (or other period) when the instrument will be silent; a relatively high number would preferably result in relatively long note durations, etc. Chord % may be used to indicate the percentage of notes that occur as part of a chord. Chord duration sensitivity % may be used to indicate the degree of cohesiveness in the stop time of multiple notes in a single chord; as an example, whether some notes in a chord can have a longer duration than others, etc. Chord velocity sensitivity % may be used to indicate the degree of cohesiveness in the velocity (e.g., volume) of multiple notes that occur as part of a chord. Velocity accent may be used as a parameter to indicate to the algorithm the location of an accent; this may be used to indicate that a bass guitar in a reggae style accent the upbeat, for example. Similarly, velocity dynamic may be used to indicate the degree to which the accent occurs; a relatively high degree of accent would preferably result in a relatively high velocity (e.g., volume) of a musical event that occurs on the accent, as compared to the other music events of the given instrument. Humanization may be used as a parameter to indicate a degree of irregularity in the rhythmic events. These are examples of parameters that may advantageously be used to assign durations to the rhythmic events. Other parameters may be substituted or added depending on the implementation while still achieving the benefits of the present invention. The result of this step preferably is to generate virtual pattern sub block data that can be processed in a manner as discussed elsewhere in this disclosure in connection with figures such as FIG. 23.

Referring back to FIG. 23, once the sub-blocks are available (e.g., from a list or from a block rule algorithm) they are processed into a Virtual Pattern (VP) at step 2. At this point in this example, a VP preferably is not music, although it does contain rhythmic information, and certain other embedded musical characteristics. At step 3, using the embedded musical characteristics of the VP data structure, musical rules preferably are applied to the VP to add more musicality to the pattern, and the result preferably contains both the rhythmic information of the VP, as well as actual musical information. At step 4 a tonic is preferably applied to the output from step 3, in that each measure preferably is musically transposed according to a tonic algorithm to impart a chordal progression to the data structures. Then at step 5, a mode preferably is applied that makes subtle changes to the musical information to output music information preferably set to a particular musical mode. Then, at step 6, a key preferably is applied to the data structure to allow key changes, and/or key consistency among various song components. Finally, at step 7, a global pitch adjustment preferably can be applied to the data structure, along with the rest of the song components, to allow real time pitch/tempo shifting during song play.

Before going through the steps described in FIG. 23 in more detail, a discussion of the embedded characteristics mentioned above, as well as some mention of tonic and key theory will be helpful.

Bearing in mind that the MIDI Specification offers a concise way to digitally represent music, and that one significant destination of the output data from the presently discussed musical rules is the MIDI digital signal processor, we have found it advantageous in certain embodiments to use a data format that has some similarities with the MIDI language. In the discussion that follows, we go through the steps of FIG. 23 in detail, with some examples of the data that can be used at each step. While the described data format is similar to MIDI, it is important to understand the differences. Basically, the present discussion describes how we embed additional context-specific meaning in an otherwise MIDI compliant data stream During processing at each of the steps in FIG. 23, elements of this embedded meaning preferably is extracted, and the stream preferably is modified in some musical way accordingly. Thus, one way to consider this process is that at each step, our stream becomes closer to the actual MIDI stream that is played by the MIDI DSP.

Various examples of preferred embodiments for hardware implementation examples of the present invention will now be described.

Figure 25:
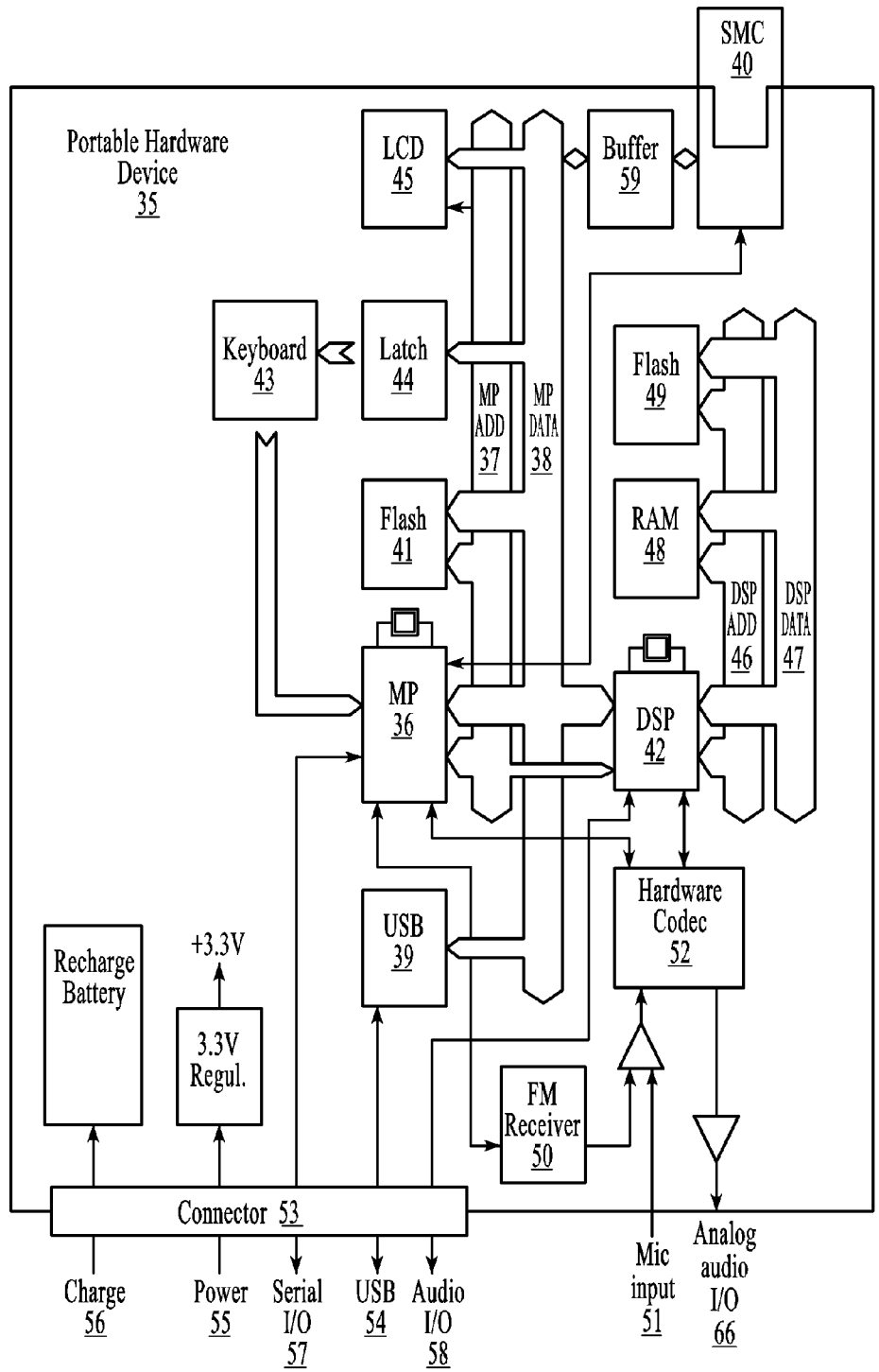
FIG. 25 illustrates an exemplary hardware configuration of certain preferred embodiments in accordance with the present invention.

FIG. 25 is a block diagram of one portable hardware device embodiment 35 of the present invention. The microprocessor (MP 36), preferably including internal RAM, controls local address and data busses (MP Add 37 and MP Data 38); the universal serial bus interface (USB 39), the smart media card interface (SMC 40) (as discussed previously, alternatives to SmartMedia, such as other types of Flash or other memory cards or other storage media such as hard disk drives or the like may be used in accordance with the present invention), and a memory such as Flash 41 are preferably on the MP data bus 38; and the MIDI/Audio DSP (DSP 42) is preferably on both the MP address bus 37 and MP data bus 38. The SMC interface 40 preferably has a buffer 59 between it and the MP Data bus 38, and there preferably are keyboard interface 42 (with MP Data Latch 44) and LCD interface 45 associated with the MP busses as well. In this example, the MP 36 can preferably perform as a sequencer to extract timing information from an input data stream and send MIDI information (possibly including NRPN-type data discussed elsewhere in this disclosure) to the DSP 42. The DSP 42 additionally preferably has dedicated address and data busses (DSP Add 46 and DSP Data 47) that preferably provide access to local RAM 48 and Flash 49 memories.

The MP 36, DSP 42, FM receiver 50, and Microphone input 51 all preferably have some type of input to the hardware CODEC 52 associated with the DSP 42.

The connector 53 illustrated in FIG. 25 can be considered as a docking station interface or as a pure USB interface or external power interface, preferably complete with interfaces for USB 54, power 55, rechargeable battery charge 56, serial I/O 57, and Audio I/O 58.

Figure 26:
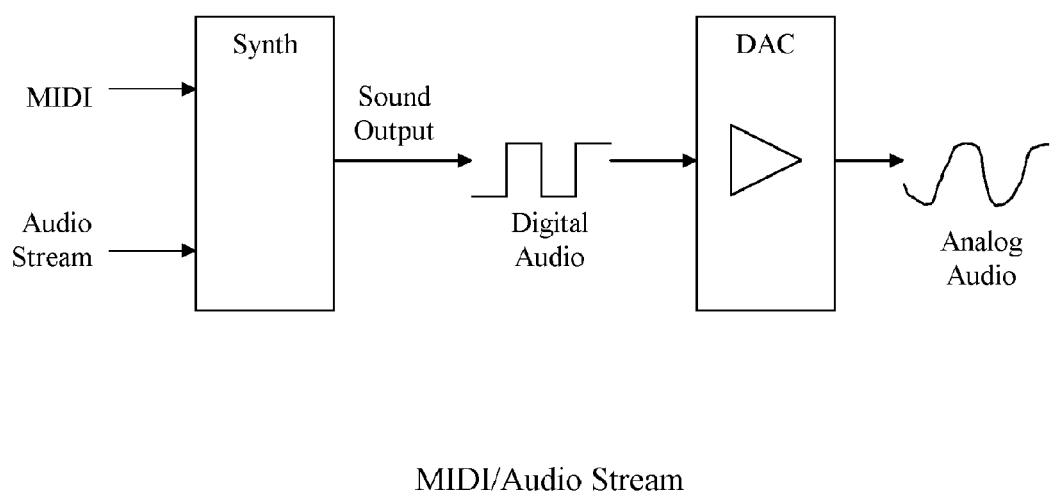
FIG. 26 illustrates a simplified logical arrangement of MIDI and audio streams in the music generation process for purposes of understanding preferred embodiments of the present invention.

FIG. 26 shows a simplified logical arrangement of the MIDI and Audio Streams in the music generation process. The two inputs going to the Synth are preferably merged and turned into a digital audio output signal. This output signal is then preferably fed to a digital to analog converter (DAC), from which is preferably output an analog audio signal suitable for use with headphones, etc. Note that in our example, the Audio stream input to the Synth might typically come from a relatively slow memory means (e.g.; Flash memory), while the MIDI input to the Synth might come from a relatively fast memory means (e.g.; SRAM buffer).

The two inputs to the Synth device preferably may actually share a multiplexed bus; but logically they can be considered as separately distinguishable inputs. In one example, the two inputs share a 23it wide bus. In this case, the MIDI input preferably may occupy 8 bits at one time, and the audio stream input preferably may occupy 23its at another time. Following this example, one stream preferably may pause while the other takes the bus. Such alternating use of the same bus can mean that relatively small pauses in each stream are constantly occurring. Such pauses are intended to be imperceptible, and so, for our purposes here, the two streams can be thought of as separate.

Figure 27:
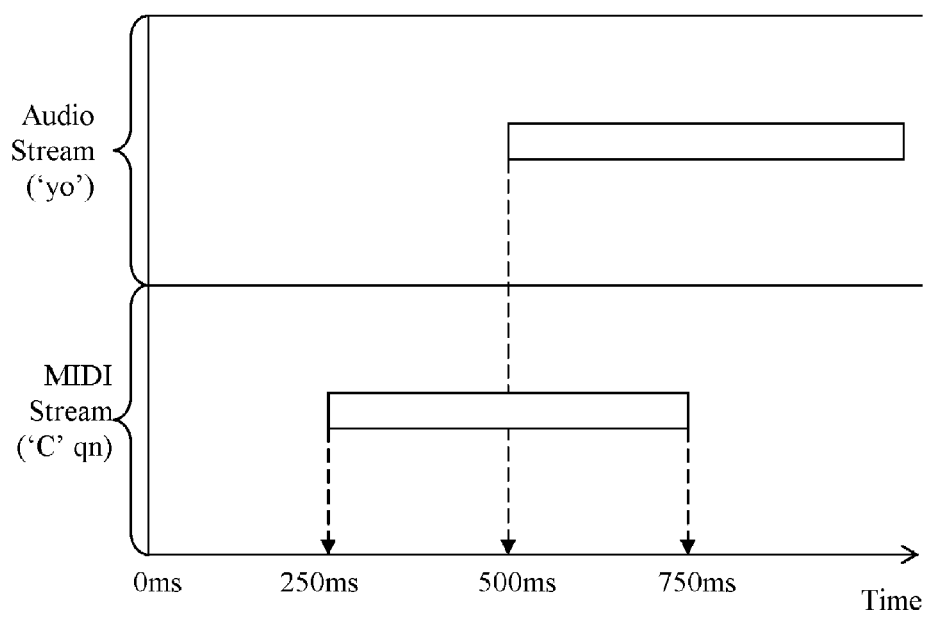
FIG. 27 illustrates a simplified MIDI and audio stream timeline for purposes of understanding preferred embodiments of the present invention.

FIG. 27 shows a simplified MIDI/Audio Stream timeline. Assume that FIG. 27 is the timing for the very beginning of a Block. It follows then, that in this case, the designer wants to play a MIDI note, starting 250 ms after the beginning of the Block, that will last 500 ms. The duration of the note relates to the type of note being played, for example, if it is a quarter note in a 4/4 time, and with a measure duration of 2 seconds, a 500 ms would correspond to a quarter note duration. Also indicated in FIG. 27, that an Audio stream event such as a short voice sample "yo" will preferably be synchronized to occur in the middle of the MIDI event. Bear in mind that this method allows the sample to preferably be quantized to the music, in the sense that it can involve the subtle correction of minor timing errors on the part of the user by synchronizing the sample to the musical context.

In this example, largely because of the constraints of the system architecture example discussed above, this is not a trivial thing to accomplish consistently and accurately using conventional techniques. Keeping in mind that the MIDI event is preferably generated almost instantly by the Synth chip, whereas the Audio Stream event could require one or more of the following assistance from the ARM MP: fetching a sound from SMC, decompressing (PCM, etc.), adding sound effects (reverb, filters, etc.).

In this example, it is highly desirable to create a special MIDI file preferably containing delta time information for each event, and specialized non-registered parameter numbers (NRPNs). This feature is especially advantageous when used with a Sample List (as mentioned above) because the name of a particular sample in a list is preferably implicit, and the NRPNs can preferably be used to trigger different samples in the particular sample list without explicitly calling for a particular sample name or type. This type of optimization reduces the burden of fetching a particular sample by name or type, and can preferably allow the samples used to be pre-loaded. In the following discussion, it should be understood that in certain embodiments, the use of MIDI System Exclusive messages (SYSEXs) may be used in place of (or perhaps in addition to) the NRPNs.

FIG. 28 depicts an example of a MIDI NRPN that can be advantageously incorporated into the present invention to allow efficient synchronization of MIDI events with audio samples and effects. The left column depicts the hexadecimal values making up the MIDI NRPN stream. As anyone who works with the MIDI Specification (previously incorporated by reference) will appreciate, the MIDI NRPN is a data structure that enables custom use of portions of a MIDI stream. Accordingly, it can preferably be used to trigger specific custom events for a given architecture.

Figure 30:
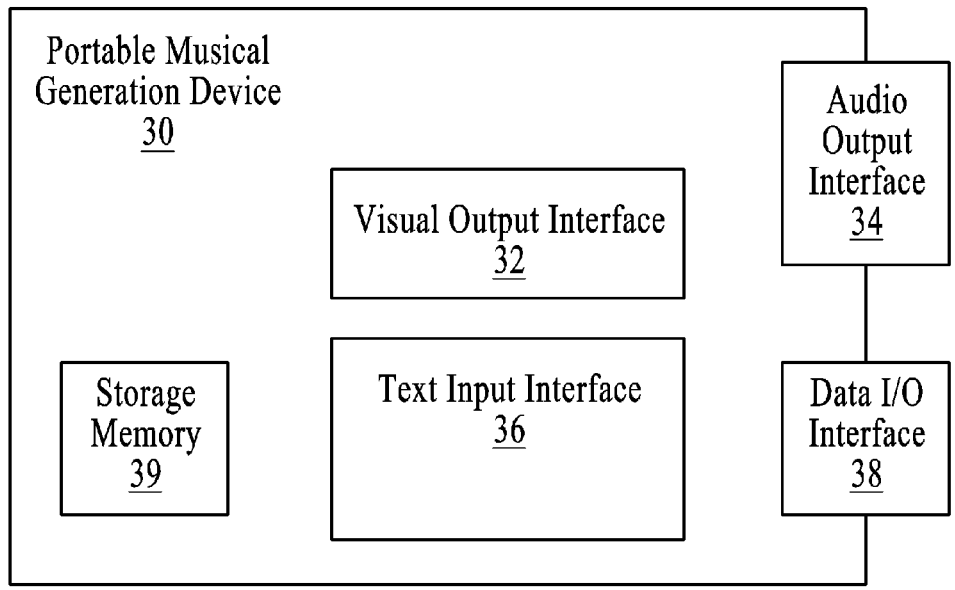
FIG. 30 illustrates an exemplary preferred portable music generation device, externally viewed, utilized in accordance with certain embodiments of the present invention involving automatic vocal features.

In FIG. 28, the first hexadecimal value 'B0' preferably indicates a channel number, as well as that it is a MIDI controller command. This can be used to assist with routing in a multi-channel arrangement. In our example, for purposes of simplicity this is set channel 0. The second value 63' preferably indicates that this particular stream contains NRPN information for a particular controller (e.g., 'A'). In this example, NRPN Controller A can be understood by the firmware/software to indicate an audio sample type. The third row value of '40' preferably is data that corresponds to the controller, and in our example this data can be understood to describe the type of sample. As an example of the usefulness of this arrangement, if the type is set to 'long', then the firmware/software preferably can arrange to load the sample in chunks. In another example, this 'type' of sample can be used to differentiate between long and short samples so that the algorithm may use them differently during auto composition. The fourth row preferably indicates a delta time, in MIDI ticks, that can preferably be used to precisely time the next event. In our example, this delta time is set to '00' for simplicity. The fifth row preferably indicates that this particular stream contains NRPN information for a 'B' controller. In this example, NRPN Controller B can be understood by firmware/software to indicate an audio effects type. This is because we have found it advantageous to use a MIDI DSP component that includes certain audio effects that can be controlled effectively in a timely manner via MIDI NRPNs. The sixth row preferably indicates the identification of the particular audio effects type called for in this NRPN example. While '00' is shown for simplicity, it should be understood that the value in this part of the MIDI stream can be interpreted by the firmware/software to select a particular effect from the available audio effects for a particular architecture. The seventh row preferably indicates another delta time that can be interpreted as a delay. The eighth row preferably can be used to indicate to the firmware/software the identification of a register to store the NRPN Controller A value shown in row nine. The ninth row uses '03' as an example; this preferably can be interpreted to mean the third audio sample in a list corresponding to a song (see 'Sample List' in FIGS. 30 and 31). Value '00' can be used effectively to instruct the firmware/software to select a sample from the sample list randomly. The tenth row of FIG. 28 is preferably another delta time value (e.g., '00' is zero MIDI ticks). The eleventh row preferably can be used to indicate to the firmware/software the identification of a register to store the NRPN Controller B value shown in row 12. The twelfth row uses '07' as an example; in the present discussion this preferably can be interpreted by the firmware/software to instruct the MIDI DSP to apply a particular audio effect among those available.

Figure 29:
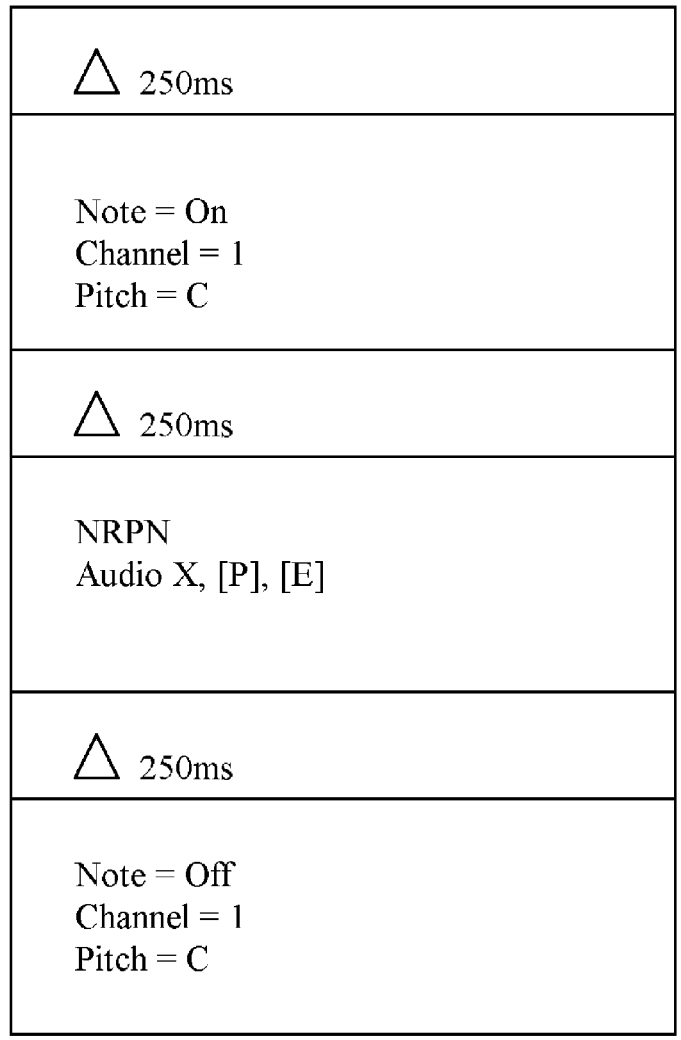

FIG. 29 is a simplified depiction of a special MIDI type file that is an example of the arrangement of the data being sent from the ARM MP to the DSP preferably via the MIDI input stream, along the lines of the example above.

The top of the figure indicates that the first information in this file is a delta time of 250 ms. This corresponds to the 250 ms delay at the beginning of FIG. 27. Next in the file depicted in FIG. 29 is general MIDI information preferably indicating a note on event for channel 1, pitch C. This corresponds to the time in FIG. 27 when 250 ms has passed. Next in FIG. 29, we have another 250 ms delta time. This represents the time between the previous MIDI event, and the next Audio Stream event at time 500 ms in FIG. 27. Next, in FIG. 29 we have an NRPN message that preferably indicates to the Synth chip that it needs to play the audio stream event X, with various parameters P, and various effects E. This corresponds to the audio stream event ('yo') depicted in FIG. 27. Then, in FIG. 29 we have another delta time event of 250 ms, followed by the general MIDI information preferably indicating a note off event for channel 1, pitch C. This final step corresponds to the end of the MIDI event in FIG. 27 (e.g., 'C' quarter note).

In the previous example, the delta time preferably can be different (and often is) each time in the special MIDI type file. In our simplified example, and because we want to make the timing relationship with a quarter note, etc., more clear, we have used the same 250 ms value each time. Obviously, in a more complex file, the delta time will vary.

Additionally, in certain embodiments it is preferable to detect the speed and/or velocity of a button press. In many of these embodiments, when the button press is, for example, causing a sample event to occur, it is preferable to pass the detected velocity-type information of the button press event into a MIDI-type event that triggers the sample to be played. In these examples, the velocity-type information can be advantageously represented in a MIDI-type event, in the portion of the event designated for velocity, aftertouch, volume, etc. Additionally, a MIDI-type event such as a system exclusive message, or an NRPN message, can alternatively be used.

As previously described, voice and other audio samples may be encoded, stored and processed for playback in accordance with the present invention. In certain preferred embodiments, voice samples are coded in a PCM format, and preferably in the form of an adaptive (predictive), differential PCM (ADPCM) format. While other PCM formats or other sample coding formats may be used in accordance with the present invention, and particular PCM coding formats (and ways of providing effects as will be hereinafter described) are not essential to practice various aspects of the present invention, a description of exemplary ADPCM as well as certain effects functions will be provided for a fuller understanding of certain preferred embodiments of the present invention. In accordance with such embodiments, a type of ADPCM may provide certain advantages in accordance with the present invention.

In certain embodiments involving a telephone, a visual animation may launch upon the ringing of the phone call (and in certain cases, the phone call ring itself may use certain of the other embodiments described throughout this disclosure). Animated characters preferably can be pre-assigned to represent and identify a caller, e.g., based on the caller ID information transmitted. In this fashion, a user preferably has the capability to play a custom animation and/or music, that preferably is based on the identity of the caller.

As will be appreciated, many advantageous aspects of the present invention can be realized in a portable communications device such as a cellular telephone, PDA, etc. As an example, in the case of a portable communications device incorporating a digital camera (e.g., similar in certain respects to the Nokia 3650 cellular telephone with a built-in image capture device, expected to be available from Nokia Group sometime in 2003), certain preferred embodiments involve the use of the algorithmic music generation/auto-composition functions in the portable communications device. Following this example, the use of a digital image capture device as part of such embodiments can allow a user to take one or more pictures (moving or still) and set them to music, preferably as a slideshow. Such augmented images can be exchanged between systems, as the data structure required to store music (e.g., SDS and CDS structures and features illustrated in FIGS. 29-32 and discussed herein) preferably is relatively efficient, and accordingly lends itself to such a slideshow distribution, as the bandwidth available to such a portable communications device is relatively limited.

As will be appreciated, aspects of the present invention may be incorporated into a variety of systems and applications, an example of which may be a PBX or other telephone type system. An exemplary system is disclosed in, for example, U.S. Pat. No. 6,289,025 to Pang et al., which is hereby incorporated by reference (other exemplary systems include PBX systems from companies such as Alcatel, Ericsson, Nortel, Avaya and the like). As will be appreciated from such an exemplary system, a plurality of telephones and telephony interfaces may be provided with the system, and users at the facility in which the system is located, or users who access the system externally (such as via a POTS telephone line or other telephone line), may have calls that are received by the system. Such calls may be directed by the system to particular users, or alternatively the calls may be placed on hold (such aspects of such an exemplary system are conventional and will not be described in greater detail herein). Typically, on-hold music is provided to callers placed on hold, with the on-hold music consisting of a radio station or taped or other recorded music coupled through an audio input, typically processed with a coder and provided as an audio stream (such as PCM) and coupled to the telephone of the caller on hold.

In accordance with embodiments of the present invention, however, one or more modules are provided in the exemplary system to provide on-hold music to the caller on hold. Such a module, for example, could include the required constituent hardware/software components of a Player as described elsewhere herein (for purposes of this discussion such constituent hardware/software components are referred to as an "auto-composition engine"), but with the user interface adapted for the PBX-type of environment. In one such exemplary embodiment, one or more auto-composition engines are provided, which serve to provide the on-hold music to one or more callers on hold. In one example, a single auto-composition engine is provided, and the first caller on hold may initially be presented with auto-composed music of a particular style as determined by the auto-composition engine (or processor controlling the exemplary system) (this may also be a default on hold music style selected by a configuration parameter of the exemplary system). Preferably, via an audio prompt provided by the resources of the exemplary system, the caller on hold is provided with audio information indicating that the caller on hold may change the style of on-hold music being provided (such audio prompt generation is considered conventional in the context of such exemplary systems and will not be described in greater detail herein). Preferably, the user may indicate such desire by pressing a predetermined digit (which preferably is identified in the audio prompt) on the telephone key pad, which may be detected by the resources of the exemplary system (such digit detection capability is considered conventional in the context of such exemplary systems and will not be described in greater detail herein), and thereafter may be provided with preferably a plurality of music styles from which to select the style of on-hold music (such as with audio prompts providing available styles of music followed by one or more digits to be entered to select the desired style of music). Thereafter, the user may depress the appropriate digit(s) on the telephone keypad, which are detected by the resources of the exemplary system, which preferably decodes the digits and sends control information to one of the auto-composition engines, in response to which the auto-composition engine thereafter begins to auto-compose music of the selected style, which is directed to the caller on hold as on hold music.

What is important is that, in accordance with such embodiments, one or more auto-composition engines are adapted for the exemplary system, with the command/control interface of the auto-composition engine being changes from buttons and the like to commands from the resources of the exemplary system (which are generated in response to calls being placed on hold, digit detection and the like). In accordance with variations of such embodiments, a plurality of auto-composition engines are provided, and the resources of the system selectively provide on-hold music to on hold callers of a style selected by the caller on hold (such as described above). In one variation, there may potentially be more callers on hold than there are auto-composition engines; in such embodiments, the callers on hold are selectively coupled to one of the output audio streams of the auto-composition engines provided that there is at least one auto-composition engine that is not being utilized. If a caller is placed on hold at a time when all of the auto-composition engines are being utilized, the caller placed on hold is either coupled to one of the audio streams being output by one of the auto-composition engines (without being given a choice), or alternatively is provided with an audio prompt informing the user of the styles of on-hold music that are currently being offered by the auto-composition engines (in response thereto, this caller on hold may select one of the styles being offered by depressed one or more digits on the telephone keypad and be coupled to an audio stream that is providing auto-composed music of the selected style).

Other variations of such embodiments include: (1) the resources of the exemplary system detect, such as via caller ID information or incoming trunk group of the incoming call, information regarding the calling party (such as geographic location), and thereafter directs that the on hold music for the particular on hold be a predetermined style corresponding to the caller ID information or trunk group information, etc.; (2) the resources of the exemplary system selectively determines the style of the on-hold music based on the identity of the called party (particular called parties may, for example, set a configuration parameter that directs that their on hold music be of a particular style); (3) the resources of the exemplary system may selectively determine the style of on-hold music by season of the year, time of day or week, etc.; (4) the exemplary system includes an auto-composition engine for each of the styles being offered, thereby ensuring that all callers on-hold can select one of the styles that are offered; (5) default or initial music styles (such as determined by the resources of the exemplary system or called party, etc., as described above) are followed by audio prompts that enable the caller on hold to change the music style; and (6) the resources of the exemplary system further provide audio prompts that enable a user to select particular music styles and also parameters that may be changed for the music being auto-composed in the particular music style (in essence, audio prompt generation and digit detection is provided by the resources of the exemplary system to enable the caller on hold to alter parameters of the music being auto-composed, such as described elsewhere herein.

In yet another alternative embodiment, the use of such key entry enables the user to input a name (e.g., his/her name or that of a loved one, or some other word) into the automatic music generation system. In an exemplary alternative embodiment, the typed name is used to initial the autocomposition process in a deterministic manner, such that a unique song determined by the key entry, is automatically composed based on the key entry of the name. In accordance with certain disclosed embodiments in the referenced and incorporated patent applications, for example, the characters of the name are used in an algorithm to produce initial seeds, musical data or entry into a pseudo random number generation process (PRNG) or the like, etc., whereby initial data to initiate the autocomposition process are determined based on the entry of the name. As one example, add the ASCII representation of each entered character, perhaps apply some math to the number, and use the resulting number as an entry into a PRNG process, etc. As another example, each letter could have a numeric value as used on a typical numeric keypad (e.g., the letters 'abc' corresponds to the number '2', 'def' to 3, etc.,) and the numbers could be processed mathematically to result in an appropriate entry to a PRNG process. This latter example may be particularly advantageous in situations where certain of the presently disclosed embodiments are incorporated into a portable telephone, or similar portable product (such as a personal digital assistant or a pager) where a keypad interface is supported.

As will be appreciated, the concept of name entry to initiate the autocomposition process is not limited to names, could be extended to other alphanumeric, graphic or other data input (a birthdate, words, random typed characters, etc.). With respect to embodiments using a touchscreen, for example, other input, such as drawn lines, figures, random lines, graphic, dots, etc., could be used to initiate the autocomposition process, either deterministically or based on timing of user entry or the like. What is important is that user entry such as keyboard entry of alphanumeric characteristics or other data entry such as drawings lines via the touchscreen (i.e., e.g., data entry that is generally not musical in nature), can be used to initiate the composition of music uniquely associated with the data entry events. Thus, unique music compositions may be created based on non-musical data entry, enabling a non-musically inclined person to create unique music based on non-musical data entry. Based on such non-musical data input, the music generation process picks seeds or other music generation initiation data and begins the autocomposition process. As will be appreciated, particularly with respect to entered alphanumeric data entry, such characters also could be stored (either alone or with music generation initiation data associated with the data entry), could be transmitted to another music generation system, whereby the transmission of the non-musical data is used to, in effect, transmit a unique song to another user/system, with the transmission constituting only a small number of bytes of data to transmit information determining the song to be created by the music generation system.

Figure 31:
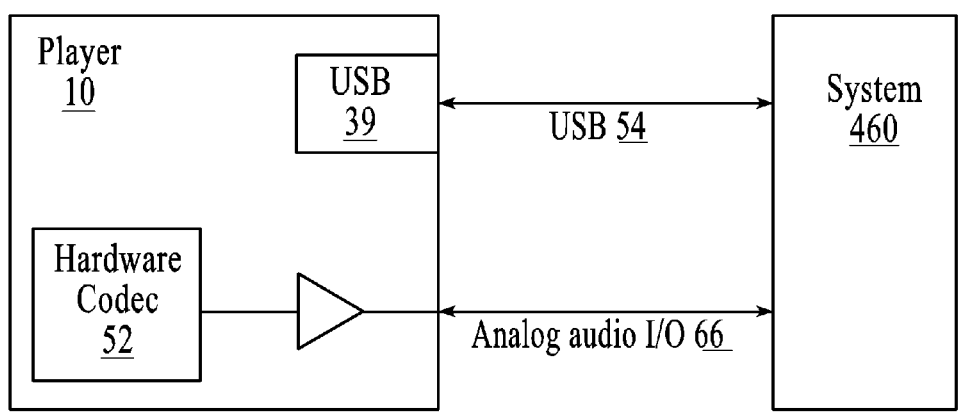
FIG. 31 illustrates exemplary preferred embodiments of interconnection arrangements between a player device and an external system.

FIG. 31 illustrates an example of how such an audio device preferably may be connected to a system to facilitate the sharing of audio information in a streaming format. As shown, player 10 is connected to system 460 via connector 53 and analog audio I/O 66. As will be evident to one of ordinary skill in the art, either connection can be used alone or in combination with the other. In one embodiment, system 460 is a personal computer with an audio input plug (and associated audio processing circuitry and software) and a USB port (in certain embodiments USB 39 can be alternatively be a PCMCIA, cardbus, serial, parallel, IrDA, wireless LAN, etc. interface). In certain embodiments, system 460 preferably can be a tape recorder, a CD recorder, an MP3 player, etc. System 460 can be any audio capable device (e.g., with an audio I/O connection and associated capabilities), and optionally may also include a bus port for connecting to connector 53 of player 10.

Continuing the discussion above in connection with FIG. 31, in certain embodiments, the digital signal 62 output from DSP 42 during an audio generation operation of player 10 preferably can be in the I2S format, and preferably can be routed via additional signal line(s) to USB I/F 39 (alternatively Serial I/O 57). In this example, USB I/F 39 (alternatively Serial I/O 57) preferably is a bus master that is preferably capable of directly accepting an input signal from DSP 42 (such as an I2S format signal) and conforming it into an output data stream on connector 53. In this example, an exemplary device that may advantageously be used as USB I/F 39 (alternatively Serial I/O 57) is the SL11R USB controller available from ScanLogic Corporation in Burlington, Mass.

In certain embodiments, digital signal 62 output from DSP 42 during an audio generation operation of player 10 can preferably be routed via additional signal line(s) to MP address bus 37 and MP data bus 38. In this example USB I/F 39 (alternatively Serial I/O 57) can advantageously be a slave USB device such as the SL811S USB Dual Speed Slave Controller also available from ScanLogic Corporation. In this example, while certain cost savings can be realized with the use of a simpler USB I/F 39 (as opposed to a master USB device such as the SL811R mentioned above), a trade-off is that MP 36 will need to be capable of controlling the flow of digital signal 62. This is primarily because in this example MP 36 is the master of MP address bus 37 and MP data bus 38, and will need to perform the transfer operations involving this bus. In certain cases where MP 36 already has sufficient capabilities to perform these added functions, this embodiment may be preferable. As mentioned above in the previous embodiment, in other cases where price/performance is at a premium the use of a more capable USB I/F 39 (alternatively Serial I/O 57) part can be used with little detrimental effect to the available resources on MP address bus 37 and MP data bus 38.

In the examples described above, the audio information output from DSP 42, in the form of digital data, is sent over the connector 53 for reception by system 460. System 460 must be capable of receiving such digital data via a corresponding bus port (e.g., a USB port, or alternatively, another port such as, for example, a port compatible with at least one of the following standards: PCMCIA, cardbus, serial, parallel, IrDA, wireless LAN (e.g., 802.11), etc.

Such an arrangement will preferably involve the use of a control mechanism (e.g., synchronization between the audio playing and capturing) to allow a more user-friendly experience for the user, while the user is viewing/participating in operations such as generation/composition of music on player 10, routing of digital audio information from digital signal 62 to connector 53, receiving and processing of audio information on system 460, and recording the audio information on system 460. One example of such a control mechanism is a software/firmware application running on system 460 that responds to user input and initiates the process with player 10 via connector 53 using control signals that direct MP 36 to begin the audio generation process. Alternatively, the user input that initiates the procedure can be first received on player 10 as long as the control mechanism and/or system 460 are in a prepared state to participate in the procedure and receive the digital audio information.

In the foregoing discussion, control information preferably flows between player 10 and system 460 over connector 53 (e.g., in addition to digital audio information). Such control information may not be necessary in order to practice certain aspects of the present invention, but if used, will provide the end user with a more intuitive experience. For example, in certain embodiments such an arrangement which incorporates a controllable data link preferably will not require a connection on analog audio I/O 66 (e.g., an analog audio link using, for example, an eighth inch stereo phono plug), as digital audio data can be controllably directed over connector 53 (e.g., in lieu of analog audio information passing over analog audio I/O 66).

In certain alternative embodiments, e.g., with more processing resources, digital signal 62 output from DSP 42 during an audio generation operation of player 10 can preferably be routed to a local memory location on the player 10 (e.g., a removable memory such as via SMC 40, or a microdrive, RAM, other Flash, etc.). In this fashion, a digital audio stream can be saved without the use of an external system such as system 460. Possible digital formats that can be used in such an operation preferably include MP3, WAV, and/or CD audio.

In other embodiments, routing audio information to system 460 (e.g., to enable sharing, etc.) can be achieved by routing analog signal 64 through analog audio I/O 66 to a corresponding analog audio input (e.g., eighth inch stereo phono input plug) on system 460 (e.g., by use of an existing sound card, etc.). In this case, the alternative signaling embodiments discussed herein preferably may not required, in that the digital audio information output from DSP 42 does not need to be routed to connector 53. Such an embodiment may be advantageous in certain applications, as it may not require either a more capable MP 36, or a mastering type of USB I/F 39, and accordingly may provide a more cost-effective solution. Consequently, the present embodiment can easily and efficiently be incorporated into player 10. In spite of such ease and efficiency, the present approach may be less desirable in certain respects than the previous embodiments, as the format of the audio information being passed to system 460 is analog, and thus more susceptible to signal loss and/or signal interference (e.g., electromagnetic). In any event, this arrangement can additionally preferably involve control information passing between system 460 and player 10 via connector 53. Such an arrangement can provide the end user with a more intuitive experience (in the various ways referred to herein) in that the user can initiate the process, and the synchronization of the process can be achieved transparently to the user via control information passing between the devices through connector 53.

Preferred embodiments of the present invention provide a portable automatic music generation device, which may be implemented such as disclosed herein. In accordance with the present invention, however, it should be noted that a wireless capability, such as that used in a cell phone, a personal data assistant, etc., may easily be incorporated into the example architectures of the previously described portable automatic music generation device. As one example, a USB communication interface of the previous disclosure preferably could be substituted with a communication interface connecting to the data reception and/or broadcast circuitry of a preferably RFamplifier-based cellular communication module. Other data interface arrangements can be effectuated while still achieving the benefits of the present invention. Similarly, the portable device may be part of an automobile-based system (e.g., radio or communications system), or even part of a home-based music system (e.g., for purposes of compatibility with bandwidth-poor portable technology). All such implementation examples are within the scope of the present invention.

Figure 32:
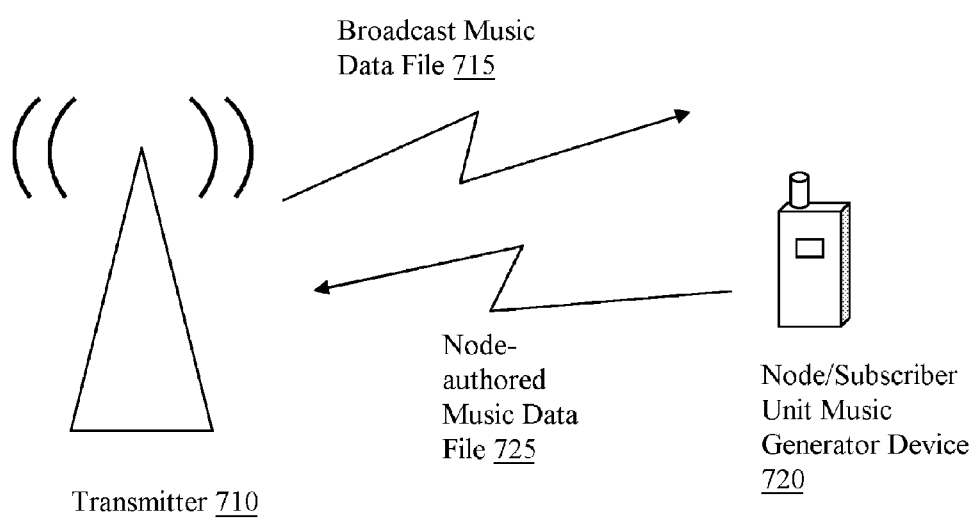
FIG. 32 illustrates exemplary preferred broadcast and transmission of data files in accordance with certain embodiments of the present invention.

FIG. 32 illustrates a broadcast arrangement in accordance with preferred embodiments, wherein Transmitter 710 is broadcasting Broadcast Music Data File 715, preferably as part of a larger broadcast program (which preferably consists of multiple styles/categories of music or other content, etc.). As shown in FIG. 32, Node Music Generator Device 720 preferably receives Broadcast Music Data File 715 and begins to generate music therefrom. It should be noted that Node Music Generator Device 720, in accordance with such embodiments, may receive Music Data File 715 and begin automatically composing music based on the received Music Data File 715, or the music generation may begin after receipt of user input, such as a key, button or switch depression or activation, and alternatively the music generation may being after modification of the user of received Music Data File 715.

FIG. 32 also illustrates an alternative embodiment in which a Node-authored Music Data File 725 is uploaded from Node Music Generator Device 720 to Transmitter 710. Node-authored Music Data File 725, for example, could be a music data file that was automatically composed by Node Music Generator Device 720, which may have been modified by the user of such Node, or may be a music data file that was previously received by such Node, which may have been thereafter modified by the user of such Node, etc. It should be understood that, while the example of FIG. 32 describes the Node-authored file being sent to the Transmitter 710, in accordance with alternative embodiments Music Data File 725 is sent to another similar Node, which preferably also is associated with Transmitter 710, or in yet other alternative embodiments is sent to another Node directly. For example, the Node-authored Music Data File 725 can be sent to a receiver associated with a broadcasting service that is directing the broadcasting of Broadcast Music Data File 715. This "upload" function preferably enables a node subscriber unit to author music and forward it up to the broadcast system, where it may be incorporated into the broadcast. As can be appreciated, this approach preferably enables user participation in the actual music being broadcast, and can allow sharing of music between nodes. This approach also preferably enables easy sharing of music content between nodes directly (e.g., not involving general broadcast from a Transmitter 710).

Figure 33:
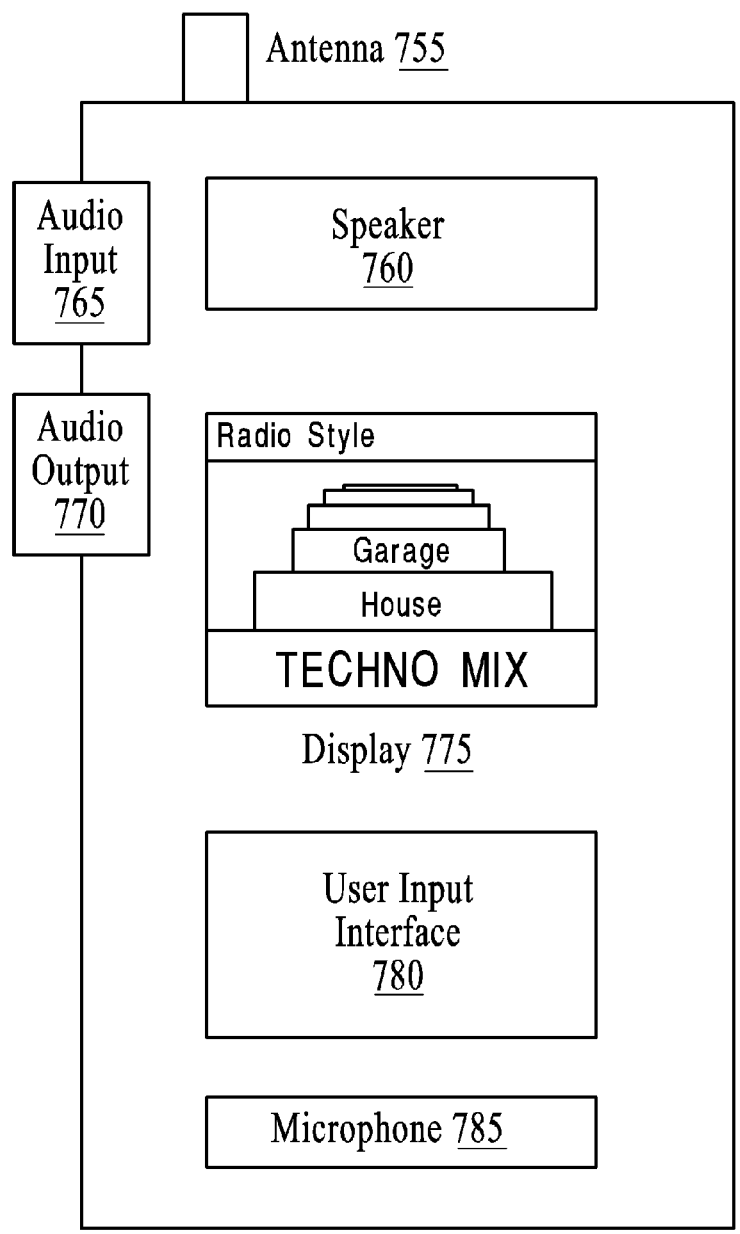
FIG. 33 illustrates an exemplary preferred node/subscriber unit, externally viewed, in accordance with certain embodiments of the present invention.

FIG. 33 illustrates selection of a music style within a Node/Subscriber Unit Radio. As illustrated, the Node Subscriber Unit preferably includes an Antenna 755 for receiving/transmitting information. Preferably, such a Node Subscriber Unit also will incorporate one or more of the following: Speaker 760, Audio Input 765, Audio Output 770, Display 775, User Interface 780, and Microphone 785. As illustrated, Display 775 preferably can be used to provide a user with a radio style selection view. Such a view preferably allows the user to easily select between a plurality of radio stations and/or music styles. Preferably, after selecting a station and/or style, the broadcast/reception activities (e.g., as described herein in connection with FIG. 32) can take place, preferably with the user-selected station/style corresponding to the style of music data file to be received.

Figure 34:
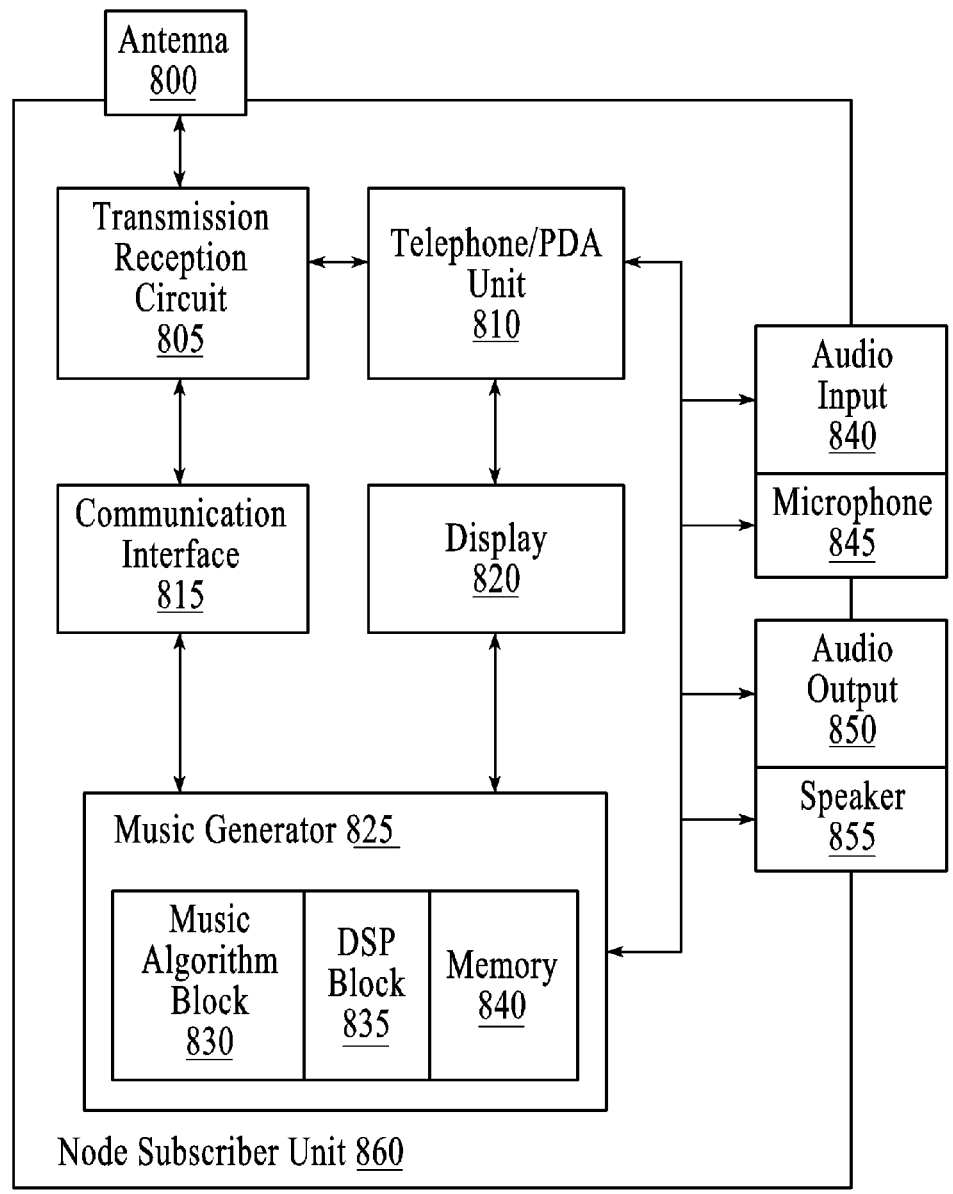
FIG. 34 illustrates exemplary preferred functional blocks utilized in a node/subscriber unit in accordance with certain embodiments of the present invention.

FIG. 34 illustrates an example of certain functional blocks associated with a preferred embodiment of a Node Subscriber Unit of the present invention. Node Subscriber Unit 860 preferably includes Antenna 800, Transmission/Reception Circuit 805, Telephone/PDA Unit 810, Communication Interface 815, and Display 820. Additionally, it preferably includes a Music Generator 825, which itself preferably includes Music Algorithm Block 830, DSP Block 835, and Memory 840. Such an exemplary Node Subscriber Unit also preferably contains one or more of the following: Audio Input 840, Microphone 845, Audio Output 850, and Speaker 855.

Figure 15:

As discussed elsewhere in this specification, the use of certain features of the present invention is particularly advantageous in a telephone device such as a portable telephone, where a ringtone may be algorithmically created in a manner consistent with many aspects of the present invention. As an example, the "Dynamic Ringtone" features (e.g., as illustrated in FIG. 15) of certain embodiments of the present invention may preferably be used in the following manner: In certain examples where it may be preferable to instill a degree of variety in a ringtone (e.g., so that it is noticeably different each time the telephone rings), it may also be preferable to retain a degree of recognizability in the theme of the ringtone. This feature may be particularly advantageous in connection with an artist-specific ringtone or the like, so that a song is recognizable each time the phone rings, but it is also a bit different each time. As an example, a technique may be used where a subset of the music lanes (tracks, instruments, etc.) may be inaccessible (e.g., to the user, the algorithm, etc.). In this example, this subset of lanes may contain the main theme of a song (or style, etc.). In this fashion, the other lanes may vary each time the ringtone is played, yet the theme will remain recognizable. Many of these features have applicability to other, non-ringtone, implementations as well, such as a portable music player, video game device, website plug-in, etc. Furthermore, this "dynamic ringtone" function preferably may be adapted in various architectures with similar benefits, such as the various client/server architectures discussed elsewhere herein, e.g., in connection with FIGS. 1-4.

An additional feature that is preferable in certain portable environments such as telephone ringtone composition environments is to perform the algorithmic composition at the conclusion of a phone call. In this example, as discussed in more detail above, a ringtone may vary to some degree each time it is invoked (e.g., via an incoming phone call). In certain embodiments, the ringtone may vary to a limited extent, in a manner that allows a recognizable theme to be constant. In various of these examples, it is necessary to generate the ringtone using some autocomposition algorithms, at some point before the ringtone is invoked the next time. In certain cases where there are sufficient processing resources, it may be preferable to perform this autocomposition in real time as the incoming phone call triggers the ringtone process. However, it is expected that in certain situations where processing resources may be more limited, e.g., such as in certain portable environments that minimize processing resources to maximize battery life, etc., it is preferable to initiate the ringtone autocomposition process at a more ideal time, such as when the portable device is not in a particularly busy state of operation (e.g., participating in a phone call, or some other mode that occupies substantial processing resources). In one example, it is considered advantageous to trigger the ringtone autocomposition process at the time that a phone call is terminated (or shortly thereafter). A ringtone preferably is autocomposed upon termination of a phone call, resulting in a ringtone that will be played at the next ringtone event. In this fashion, the variable ringtone feature is provided in a manner that minimizes the required amount of processing resources.

Certain aspects of the preferred embodiments disclosed herein involves a microphone input into the ringtone remixing function. As an example, microphone input 51 illustrated in FIG. 25, microphone 785 illustrated in FIG. 33, or microphone 845 illustrated in FIG. 34 may preferably be used to input a voice greeting or other vocalized sound into the system, where it can be incorporated into an alert tone such as a ringtone (e.g., a ringback tone). In this fashion, a user's voice may be blended with remixed/composed sound to create a highly personalized alert tone. In certain variations, such a ringtone may preferably be remixed on a remix server, a portable device, or via a hybrid approach, as discussed elsewhere herein.

Novel aspects of embodiments of the present invention include the usage of a particularly efficient music distribution and generation system. Unlike various FM Radio broadcast systems, or Internet streaming systems in conventional approaches, the present invention utilizes music that preferably can be generated by the Node, and preferably not by the Transmitter. The Node receives a data file that contains, in essence, data or instructions that define a song to be generated, and may be used by the hardware/software of the Node in order to generate a song (the data or instructions, however, may include some sub-components of the song that are akin to prior art broadcasting/streaming systems, such as samples). Examples of such information, data or instructions are discussed below with reference to FIGS. 35 and 36. Generally, in accordance with preferred embodiments, the instructions comprise data that can be sent, for example, in text form or some other similarly format (i.e., that consume relatively very little bandwidth, particularly as compared with conventional streaming audio-type approaches). In the examples discussed below, it is contemplated that the size of the Broadcast Music Data File (measured here in bits of data) may preferably be, for example, approximately 200 kilobits for a 3 minute song.

FIG. 35 illustrates various exemplary parameters that preferably can be incorporated into a broadcast music data file.

'Application Revision' is preferably used to store the firmware/application version used to generate the data structure. This is particularly helpful in cases where the firmware is upgradeable.

'Style/SubStyle' preferably is used to indicate the Style and/or SubStyle of music. This is helpful when initializing various variables and routines, to preferably alert the system that the rules associated with a particular Style and/or SubStyle will govern the song generation process. In certain preferred embodiments, Style and/or SubStyle can refer to a radio station style of music, such as 'Hard Rock', 'Ambient', 'Easy Listening', etc. In certain cases, for example as discussed below, the radio station style may be user-selectable prior to the reception of the music data file.

'Sound Bank/Synth Type' preferably indicates the particular sound(s) that will be used in the generation of the song. As an example, this can be a way to preload the sound settings for a MIDI DSP resource.

'Sample Frequency' preferably is a setting that can be used to indicate how often samples will be played, if samples are incorporated into the song. Alternatively, this preferably can indicate the rate at which the sample is decoded, which provides a technique useful for adjusting the frequency of sample playback.

'Sample List' preferably lists all of the samples that are associated with the data structure. This list preferably allows a user to further select and play relevant samples during song playback.

'Key' preferably is used to indicate the first key used in the song. Preferably, one way to indicate this is with a pitch offset.

'Tempo' preferably is used to indicate the start tempo of the song. Preferably, one way to indicate this is with beats per minute (BPM) information.

'Instrument' preferably is data that identifies a particular instrument in a group of instruments. For example, this could reference an acoustic nylon string guitar among a group of all guitar sounds. This data is preferably indexed by instrument type.

'State' preferably is data that indicates the state of a particular instrument. Examples of states are: muted, un-muted, normal, Forced play, solo, etc.

'Parameter' preferably is data that indicates values for various instrument parameters, such as volume, pan, timbre, etc.

'PRNG Seed Values' preferably is a series of numerical values that are used to initialize the pseudo-random number generation (PRNG) routines (such PRNG Seed Values are used in certain embodiments, but not in other embodiments; the present invention is not limited to the use of such PRNG Seed Values). These values preferably represent a particularly efficient method for storing the song by taking advantage of the inherently predictable nature of PRNG to enable the recreation of the entire song.

'Song Structure' preferably is data that preferably lists the number of instrument types in the song, as well as the number and sequence of the parts in the song.

'Structure' preferably is data that is indexed by part that preferably can include the number and sequence of the sub-parts within that part.

'Filtered Track' preferably is a parameter that preferably can be used to hold data describing the characteristics of an effect. For example, it preferably can indicate a modulation type of effect with a square wave and a particular initial value. As the effect preferably is typically connected with a particular part, this parameter may preferably be indexed by part.

'Progression' preferably is characteristic information for each sub-part. This might include a time signature, number and sequence of SEQs, list of instrument types that may be masked, etc.

'Chord' preferably contains data corresponding to musical changes during a sub-part. Chord vector (e.g., +2, −1, etc.), key note (e.g., F), and progression mode (e.g., dorian ascending) data preferably are stored along with a time stamp.

'Pattern' and the sub-parameters 'Combination', 'FX Pattern', and 'Blocks', all preferably contain the actual block data and effects information for each of the instruments that are used in the song. This data is preferably indexed by the type of instrument.

Additional parameters can preferably be included, for example to enable at least some of the soundbank data associated with a particular song to be embedded. Following this example, when such a broadcast music data file is accessed, at least some of the sound bank data preferably is loaded into non-volatile memory such that the sound bank data may be used during the generation of music output.

Additionally, many of these parameters preferably can incorporate data with associated timestamps. This optional feature can preferably be used to indicate the timing of each event, etc.

Through the use of such exemplary parameters in a broadcast song data structure, data from which a song can be generated preferably can be efficiently broadcast to a number of node music generator devices. Though the specific parameter types preferably can be varied, the use of such parameters preferably enables all the details necessary to accurately and faithfully regenerate a song from scratch at a node.

Figure 36:
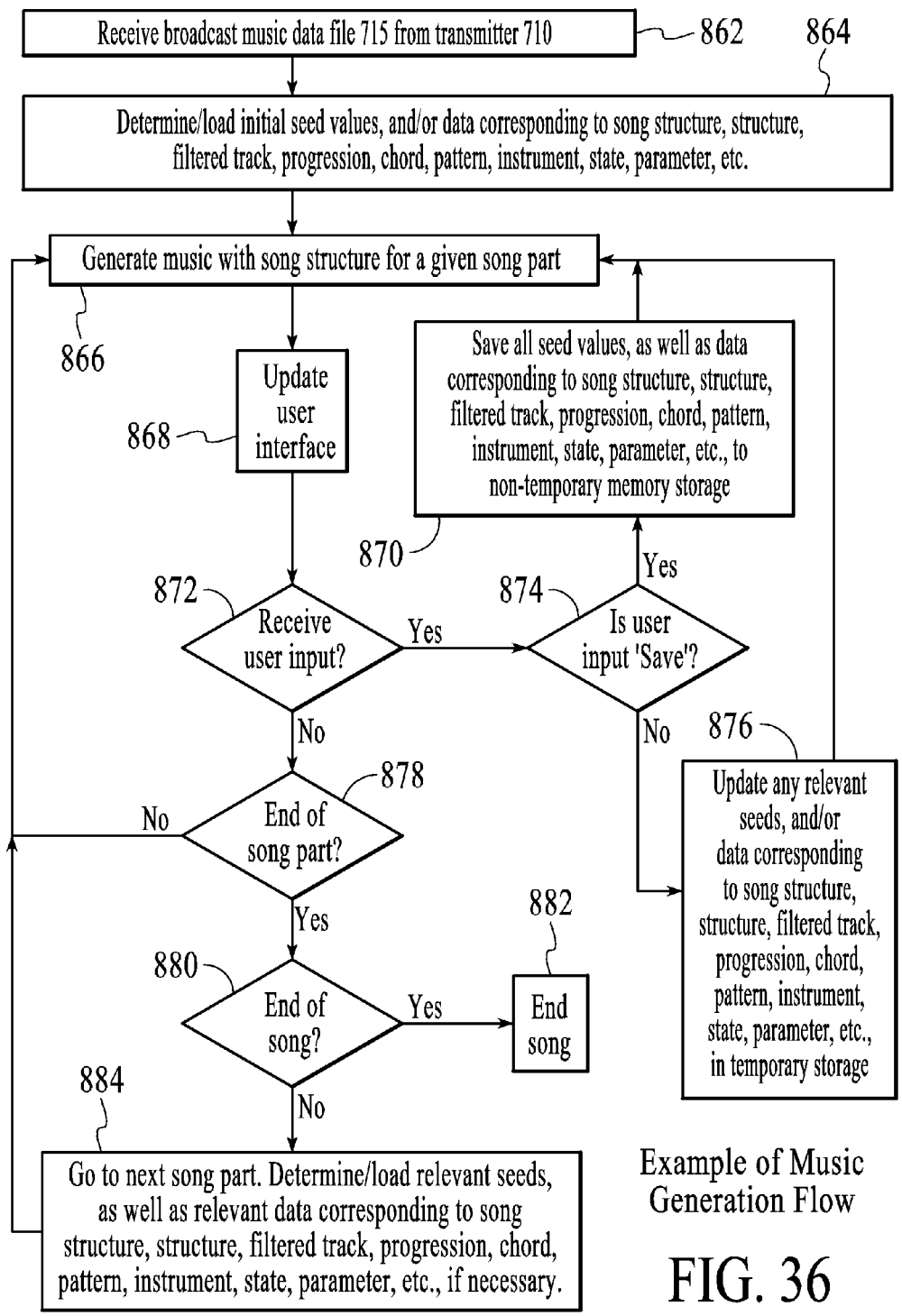
FIG. 36 illustrates an exemplary preferred process flow of a preferred music generation process in accordance with certain embodiments of the present invention.

FIG. 36 depicts a logical flow chart for a preferable general architecture that could be used by each node music generator device in combination with the broadcast song data file to practice the present invention. This flow chart illustrates the big picture for a preferable software/firmware implementation, and provides in more detail an exemplary process flow for the song generation process.

At the start of FIG. 36 (start point 862), parameter data preferably is loaded from the broadcast song data structure after it is received by a subscriber unit (block 864). Once at least some parameter values preferably are determined/loaded, the music for a given song part preferably begins to be generated (block 866), and the user interface (e.g., display, video output, force-feedback, etc.) preferably can be updated accordingly (block 868). Preferably, at any point in this process, if a user input is detected (decision block 872) (other than a 'save' command), such as a change of instrument or effect, the relevant parameter data for the part of the song currently being changed by the user preferably is updated (block 876) and the generation of the music for the given part preferably continues. If a user input 'save' command is detected (decision block 874), all parameter data preferably can be saved to a non-temporary storage location, such as Flash memory, a hard drive, or some other writeable memory storage location that affords some degree of permanence (block 870). This arrangement is desirable because it preferably allows a user to listen to most of a song before electing to save it in its entirety. As long as there is no user input, the generation of music for a given song part preferably continues until the end of song part is detected (decision block 878), at which time the flow preferably proceeds to the next song part (block 884). At this time, if necessary, the relevant parameter data for the next song part preferably are determined/loaded. Eventually, when an end-of-song condition preferably is detected (decision block 880), the song ends (block 882).

FIG. 37 describes exemplary Telecommunication Industry Association (TIA) standards that can be applied to certain embodiments of the present invention. Given the broad range of message and/or other data services options available in the present cellular industry, the music distribution concepts described herein can be implemented using a variety of different means. There are several available architectures that can be used to distribute music data files in accordance with the present disclosure; as examples, time division multiple access (TDMA), Global System for Mobile Communications (GSM), and code division multiple access (CDMA). FIG. 61 references certain standards that contain further details on preferable implementations of data distribution in a cellular context, and therefore are each hereby incorporated by reference in their entirety. Clearly this is not to be considered an exhaustive listing; rather it is intended to simply give some illustrative preferred examples of relevant published standards.

FIG. 38 provides as an example certain excerpts from one such exemplary standard: TIA/EIA IS-637 "Short Message Service for Wideband Spread Spectrum Cellular System". As indicated in FIG. 38, a SMS Broadcast Message has been defined that allows optional Bearer Data. Following this example, Bearer Data can preferably include Subparameter Data of variable length (e.g., as described in connection with SUBPARAM_LEN). This example of an SMS Broadcast Message may preferably be used to practice certain aspects of the present invention (e.g., the means to transmit Broadcast Music Data File 715 as illustrated in FIG. 32). Additionally, there are other similarly defined messages defined in the IS-637 standard that may preferably be used in association with Node-authored Music Data File 725 illustrated in FIG. 32. As one example, see the "Data Burst Message" described in TIA/EIA IS-95-A. Clearly, other standards alternatively can be adopted while achieving certain of the benefits of the present invention. Similarly, other types of data transactions identified in the aforementioned telecommunications standards may be substituted for the particular exemplary embodiments mentioned herein without departing from the spirit and scope of the present invention.

In yet another alternative embodiment, referring back to FIG. 33, the use of User Interface 780 (e.g., a typical portable phone numeric keypad, with letters overlaying certain numbers) enables the user to input a name (e.g., his/her name or that of a loved one, or some other word) into the automatic music generation system. In an exemplary alternative embodiment, the typed name is used to initial the autocomposition process in a deterministic manner, such that a unique song determined by the key entry is automatically composed based on the key entry of the name. In accordance with certain disclosed embodiments disclosed herein, for example, the characters of the name are used in an algorithm to produce initial seeds, musical data or entry into a pseudo random number generation process (PRNG) or the like, etc., whereby initial data to initiate the autocomposition process are determined based on the entry of the name. As one example, add the ASCII representation of each entered character, perhaps apply some math to the number, and use the resulting number as an entry into a PRNG process, etc. Continuing this example, each letter could have a numeric value as used on a typical numeric keypad (e.g., the letters 'abc' corresponds to the number '2', 'def' to 3, etc.,) and the numbers could be processed mathematically to result in an appropriate entry to a PRNG process. This latter example may be particularly advantageous in situations where certain of the presently disclosed embodiments are incorporated into a portable telephone, or similar portable product (such as a personal digital assistant or a pager) where a keypad interface is supported.

As the process preferably is deterministic, every entry of the name would produce the same unique or "signature" song for the particular person, at least for the same release or version of the music generation system. While the autocomposition process in alternative embodiments could be based in part on the time or timing of entry of the letters of the name, and thus injecting user time-randomness into the name entry process (such human interaction randomness also is discussed in the referenced and incorporated patent documents) and in essence a unique song generation for each name entry, in preferred alternate embodiments the deterministic, non-random method is used, as it is believed that a substantial number of users prefer having a specific song as "their song" based on their name or some other word that has significance to them (a user may enter his/her name/word in a different form, such as backwards, upside down using numbers, no capital letters, use nick names, etc. to provide a plurality of songs that may be associated with that user's name in some form, or use the numbers corresponding to a series of letters as discussed herein in connection with a numeric keypad interface). As will be appreciated by those of skill in the art, this concept also is applicable to style selection of music to be autocomposed (as described in the referenced and incorporated patent documents; the style could be part of the random selection process based on the user entry, or the style could be selected, etc.). For example, for each style or substyle of music supported by the particular music generation system, a unique song for each style or substyle could be created based on entry of the user's name (or other word), either deterministically or based, for example, on timing or other randomness of user entry of the characters or the like, with the user selecting the style, etc.

As will be appreciated, the concept of name entry to initiate the autocomposition process in Node/Subscriber Unit Music Generator Device 720 is not limited to names, could be extended to other alphanumeric, graphic or other data input (a birthdate, words, random typed characters, etc.). With respect to embodiments using a touchscreen, for example, other input, such as drawn lines, figures, random lines, graphic, dots, etc., could be used to initiate the autocomposition process, either deterministically or based on timing of user entry or the like. What is important is that user entry such as keyboard entry of alphanumeric characteristics or other data entry such as drawing lines via the touchscreen (i.e., e.g., data entry that is generally not musical in nature), can be used to initiate the composition of music uniquely associated with the data entry events. Thus, unique music compositions may be created based on non-musical data entry, enabling a non-musically inclined person to create unique music based on non-musical data entry. Based on such non-musical data input, the music generation process picks seeds or other music generation initiation data and begins the autocomposition process. As will be appreciated, particularly with respect to entered alphanumeric data entry, such characters also could be stored (either alone or with music generation initiation data associated with the data entry), could be transmitted to another music generation system (e.g., via Transmitter 710), whereby the transmission of the non-musical data is used to, in effect, transmit a unique song to another user/system, with the transmission constituting only a small number of bytes of data to transmit information determining the song to be created by the music generation system.

Figure 39:
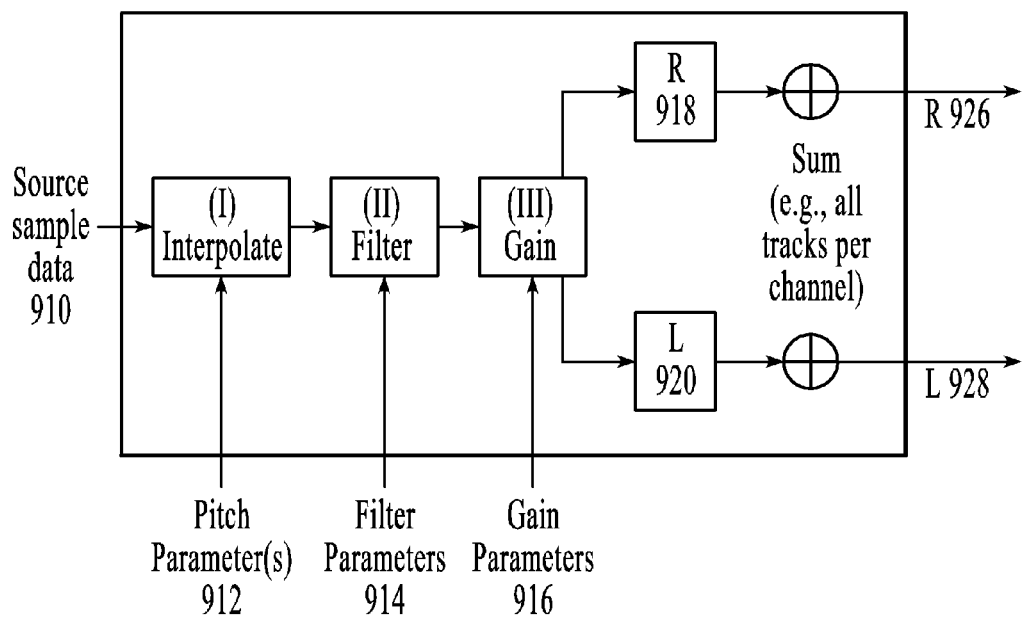
FIG. 39 illustrates certain exemplary synthesis structural description in accordance with certain embodiments of the present invention.

FIG. 39 depicts an exemplary structure of the main portion of audio synthesis 900 that executes during a processing loop. As illustrated, source sample data 910 (e.g., from parameter 902) is input to (I) Interpolate block, where it preferably is processed with pitch parameters 912 (e.g., from parameters 902); preferably fed to (II) Filter block, where it preferably is filtered with filter parameters 914 (e.g., from parameters 902); preferably fed to (III) Gain block, where it preferably is processed with gain parameters 916 (e.g., from parameters 902). At this point, in certain embodiments, the sample preferably is duplicated into two signals corresponding to right (R 918) and left (L 920) channels of a stereo output signal, e.g., via (III) Gain processing to establish a stereo field. Clearly, in certain situations where a monaural output is desired (e.g., monophonic cellular telephones), this separation into R918 and L 920 is not required. Furthermore, in certain situations where more than two output channels are desired, e.g., in the case of "5.1 multi-channel surround sound" systems that may use several speakers which each deliver a discrete channel of sound (e.g., front left, center, front right, left rear, right rear and sub woofer), gain parameters 916 preferably may be used by (III) Gain to separate the input sample into several channels, preferably in a manner similar to that depicted in FIG. 39 for two channels.

As the processing loop that is performed repeatedly by the structure depicted in FIG. 39 will typically comprise the main part of the processing performed by audio synthesis 900, this is the area where the bulk of the signal processing resources are consumed in a typical audio synthesis operation. Accordingly, in situations such as portable phones, personal digital assistants, handheld video games, portable alarm clocks, etc., where processing resources are relatively scarce, the efficiency of this small processing loop has a large impact on the quality of audio synthesis achievable by such portable systems.

In addition to the foregoing teachings, in certain preferred embodiments it may be preferable to use a relatively large sound bank, yet only select the needed sounds for a given use, such as on a song-by-song basis. In this fashion, only the sounds needed for a particular use (e.g., such as a particular song being played) need to be loaded in RAM. One advantage of this approach is that the greater sound quality preferably afforded by a larger sound bank may be used, while not occupying too much RAM space, which in certain situations may be the most critical part of memory (e.g., such as may be the case with mobile phones). Taking an example where 128 KB of ROM or Flash memory may be available for storing a sound bank, and wherein 32 KB of RAM may be available for storing the sound bank when the synthesizer is running, the advantage of the present technique is that a sound bank may preferably be sized at up to 128 KB, provided that one single MIDI song does not use more than 32 KB of data (e.g., source samples and parameters). A potential disadvantage of this technique may be that it may be problematic to guarantee that any one MIDI song will not use more than 32 KB of sound bank data. An additional technique that preferably addresses this potential problem is discussed below. The use of a sub-portion of an available sound bank on a song-by song basis is not limited to the exemplary sizes discussed herein, but rather may preferably be used in other situations where more or less resources are available for sound bank data. This technique provides a high quality sound bank, while reducing the impact on memory size footprint for a given application (e.g., song being played).

As will be understood by a person of ordinary skill in the art of portable electronic music design, the examples discussed here are representative of the full spirit and scope of the present invention. Additional variations, some of which are described here, incorporate many aspects of the present invention.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method for remixing a music piece in a portable communications device connected to a communications network, comprising the steps of:

providing a music composition graphical user interface on the portable communications device, wherein the music composition graphical user interface displays a plurality of actionable menu items, wherein a first collection of actionable menu items is provided to the music composition graphical user interface from an internal source located within the portable communications device;

providing a music remixing algorithm, wherein the music remixing algorithm incorporates music rules, and wherein the music remixing algorithm can remix the music piece in a manner where only one musical component is remixed at a given time;

providing a music remix database accessible via the music composition graphical user interface, wherein a plurality of music remix data is organized based in part on a music style parameter; and further wherein a second collection of actionable menu items is provided from the music remix database to the music composition graphical user interface via the communications network;

wherein the first collection of actionable menu items and the second collection of actionable menu items are displayed on the music composition graphical user interface on the portable communications device in a seamless manner.

2. The method of claim 1 wherein the second collection of actionable menu items is dynamically updated.

3. The method of claim 1, wherein the music remixing algorithm is a ringtone alert tone music remixing algorithm.

4. The method of claim 1 further comprising the step of providing a payment gateway service to process billing information associated with the portable communications device.

5. The method of claim 4 wherein the payment gateway service uses a token-based billing method.

6. The method of claim 3 wherein the music remixing algorithm incorporates a chord progression adjustment.

7. The method of claim 3 wherein the music remixing algorithm is wholly executed on the portable communications device.

8. The method of claim 3 wherein the music remixing algorithm is wholly executed on a music remixing server.

9. The method of claim 3 wherein a first portion of the music remixing algorithm is executed on a centralized music remixing server.

10. The method of claim 9 wherein a second portion of the music remixing algorithm is executed on the portable communications device.

* * * * *